United States Patent
Hockey et al.

(10) Patent No.: US 10,614,463 B1
(45) Date of Patent: *Apr. 7, 2020

(54) SYSTEM AND METHOD FOR FACILITATING PROGRAMMATIC VERIFICATION OF TRANSACTIONS

(71) Applicant: Plaid Inc., San Francisco, CA (US)

(72) Inventors: William Hockey, San Francisco, CA (US); Zach Perret, San Francisco, CA (US); Charles Li, San Francisco, CA (US)

(73) Assignee: Plaid Inc., San Francisco, CA (US)

( * ) Notice: Subject to any disclaimer, the term of this patent is extended or adjusted under 35 U.S.C. 154(b) by 413 days.

This patent is subject to a terminal disclaimer.

(21) Appl. No.: 15/455,959

(22) Filed: Mar. 10, 2017

Related U.S. Application Data

(63) Continuation of application No. 14/790,897, filed on Jul. 2, 2015, now Pat. No. 9,595,023, which is a (Continued)

(51) Int. Cl.
*G06Q 20/40* (2012.01)

(52) U.S. Cl.
CPC ................ *G06Q 20/4014* (2013.01)

(58) Field of Classification Search
CPC ..... G06Q 20/10; G06Q 20/40; G06Q 20/4014
(Continued)

(56) References Cited

U.S. PATENT DOCUMENTS 5,237,499 A 8/1993 Garback
5,347,632 A 9/1994 Filepp
(Continued)

FOREIGN PATENT DOCUMENTS

EP 0 848 336 6/1998
EP 0 848 338 6/1998
(Continued)

OTHER PUBLICATIONS

"A Single Login Web Service Integrator—WebEntrance", Yan Zhao, Sixth International World Wide Web Conference, Santa Clara, CA, Apr. 7-11, 1997.
(Continued)

*Primary Examiner* — Robert R Niquette
*Assistant Examiner* — Liz P Nguyen
(74) *Attorney, Agent, or Firm* — Knobbe Martens Olson & Bear LLP

(57) ABSTRACT

Systems and methods for programmatic access of a financial institution system. A normalized API request provided by an application system specifies user information corresponding to at least one account endpoint of an external financial institution system. Responsive to the request, at least one application proxy instance associated with the normalized API request is used to collect transaction information from a corresponding financial institution system by providing the financial institution system with a proprietary API request that specifies at least account credentials associated with the user information. The transaction information is included in at least one proprietary API response provided by the financial institution system. A normalized API response is generated based on the collected transaction information and provided to the application system. Each application proxy instance is constructed to simulate an application of the corresponding financial institution system on behalf of a user associated with the application proxy instance.

20 Claims, 11 Drawing Sheets

Related U.S. Application Data continuation of application No. 14/719,117, filed on May 21, 2015, now abandoned.

(60) Provisional application No. 62/001,461, filed on May 21, 2014.

(58) Field of Classification Search
USPC .......................................................... 705/44
See application file for complete search history.

(56) References Cited

U.S. PATENT DOCUMENTS

| | | |
|---|---|---|
| 5,634,127 A | 5/1997 | Cloud |
| 5,649,186 A | 7/1997 | Ferguson |
| 5,701,451 A | 12/1997 | Rogers |
| 5,710,884 A | 1/1998 | Dedrick |
| 5,710,918 A | 1/1998 | Lagarde |
| 5,721,908 A | 2/1998 | Lagarde |
| 5,727,159 A | 3/1998 | Kikinis |
| 5,745,754 A | 4/1998 | Lagarde |
| 5,752,246 A | 5/1998 | Rogers |
| 5,778,065 A | 7/1998 | Hauser et al. |
| 5,778,367 A | 7/1998 | Wesinger, Jr. et al. |
| 5,787,403 A | 7/1998 | Randle |
| 5,793,964 A | 8/1998 | Rogers |
| 5,813,007 A | 9/1998 | Nielsen |
| 5,815,665 A | 9/1998 | Teper |
| 5,819,284 A | 10/1998 | Farber |
| 5,835,724 A | 11/1998 | Smith |
| 5,838,910 A | 11/1998 | Domenikos et al. |
| 5,838,916 A | 11/1998 | Domenikos et al. |
| 5,845,073 A | 12/1998 | Carlin |
| 5,855,018 A | 12/1998 | Chor et al. |
| 5,862,325 A | 1/1999 | Reed et al. |
| 5,870,559 A | 2/1999 | Leshem et al. |
| 5,875,296 A | 2/1999 | Shi |
| 5,878,219 A | 3/1999 | Vance |
| 5,892,905 A | 4/1999 | Brandt et al. |
| 5,892,909 A | 4/1999 | Grasso |
| 5,898,836 A | 4/1999 | Freivald |
| 5,901,287 A | 5/1999 | Bull |
| 5,903,881 A | 5/1999 | Schrader |
| 5,908,469 A | 6/1999 | Botz |
| 5,913,214 A | 6/1999 | Madnick |
| 5,918,216 A | 6/1999 | Miksovsky et al. |
| 5,920,848 A | 7/1999 | Schutzer |
| 5,926,798 A | 7/1999 | Carter |
| 5,930,764 A | 7/1999 | Melchione et al. |
| 5,930,777 A | 7/1999 | Barber |
| 5,933,604 A | 8/1999 | Inakoshi |
| 5,933,816 A | 8/1999 | Zeanah |
| 5,956,720 A | 9/1999 | Fernandez et al. |
| 5,961,593 A | 10/1999 | Gabber et al. |
| 5,961,601 A | 10/1999 | Iyengar |
| 5,963,915 A | 10/1999 | Kirsch |
| 5,963,925 A | 10/1999 | Kolling |
| 5,966,967 A | 10/1999 | Agrawal |
| 5,978,828 A | 11/1999 | Greer |
| 5,978,842 A | 11/1999 | Noble |
| 5,983,267 A | 11/1999 | Shklar et al. |
| 5,983,268 A | 11/1999 | Freivald |
| 5,987,440 A | 11/1999 | O'Neil |
| 5,987,454 A | 11/1999 | Hobbs |
| 5,995,943 A | 11/1999 | Bull |
| 5,999,971 A | 12/1999 | Buckland |
| 6,003,032 A | 12/1999 | Bunney et al. |
| 6,006,333 A | 12/1999 | Nielsen |
| 6,023,698 A | 2/2000 | Lavey |
| 6,041,362 A | 3/2000 | Mears et al. |
| 6,047,327 A | 4/2000 | Tso et al. |
| 6,055,570 A | 4/2000 | Nielsen |
| 6,078,929 A | 6/2000 | Rao |
| 6,082,776 A | 7/2000 | Feinberg |
| 6,092,196 A | 7/2000 | Reiche |
| 6,092,197 A | 7/2000 | Coueignoux |
| 6,105,131 A | 8/2000 | Carroll |
| 6,119,101 A | 9/2000 | Peckover |
| 6,138,158 A | 10/2000 | Boyle |
| 6,148,337 A | 11/2000 | Estberg et al. |
| 6,151,581 A | 11/2000 | Kraftson et al. |
| 6,151,601 A | 11/2000 | Papierniak |
| 6,182,142 B1 | 1/2001 | Win |
| 6,185,567 B1 | 2/2001 | Ratnaraj et al. |
| 6,195,698 B1 | 2/2001 | Lillibridge et al. |
| 6,199,077 B1 | 3/2001 | Inala |
| 6,205,433 B1 | 3/2001 | Boesch |
| 6,208,975 B1 | 3/2001 | Bull |
| 6,209,007 B1 | 3/2001 | Kelley et al. |
| 6,243,816 B1 | 6/2001 | Fang et al. |
| 6,246,999 B1 | 6/2001 | Riley et al. |
| 6,278,449 B1 | 8/2001 | Sugiarto et al. |
| 6,278,999 B1 | 8/2001 | Knapp |
| 6,292,789 B1 | 9/2001 | Schutzer |
| 6,297,819 B1 | 10/2001 | Furst |
| 6,301,584 B1 | 10/2001 | Ranger |
| 6,308,203 B1 | 10/2001 | Itabashi et al. |
| 6,311,275 B1 | 10/2001 | Jin et al. |
| 6,317,783 B1 | 11/2001 | Freishtat |
| 6,360,205 B1 | 3/2002 | Iyengar |
| 6,366,933 B1 | 4/2002 | Ball et al. |
| 6,401,118 B1 | 6/2002 | Thomas |
| 6,405,245 B1 | 6/2002 | Burson |
| 6,412,073 B1 | 6/2002 | Rangan |
| 6,424,968 B1 | 7/2002 | Broster |
| 6,430,539 B1 | 8/2002 | Lazarus |
| 6,484,155 B1 | 11/2002 | Kiss |
| 6,499,042 B1 | 12/2002 | Markus |
| 6,510,451 B2 | 1/2003 | Wu |
| 6,567,411 B2 | 5/2003 | Dahlen |
| 6,567,850 B1 | 5/2003 | Freishtat |
| 6,594,766 B2 | 7/2003 | Rangan |
| 6,632,248 B1 | 10/2003 | Isaac et al. |
| 6,633,910 B1 | 10/2003 | Rajan |
| 6,631,402 B1 | 11/2003 | Devine |
| 6,725,200 B1 | 4/2004 | Rost |
| 6,802,042 B2 | 10/2004 | Rangan |
| 6,859,931 B1 | 2/2005 | Cheyer et al. |
| 6,957,199 B1 | 10/2005 | Fisher |
| 7,028,049 B1 | 4/2006 | Shelton |
| 7,072,932 B1 | 7/2006 | Stahl |
| 7,092,913 B2 | 8/2006 | Cannon, Jr. |
| 7,200,578 B2 | 4/2007 | Paltenghe et al. |
| 7,263,548 B2 | 8/2007 | Daswani |
| 7,275,046 B1 | 9/2007 | Tritt et al. |
| 7,340,411 B2 | 3/2008 | Cook |
| 7,424,520 B2 | 9/2008 | Daswani |
| 7,752,535 B2 | 7/2010 | Satyavolu |
| 8,006,291 B2 | 8/2011 | Headley et al. |
| 8,010,783 B1 | 8/2011 | Cahill |
| 8,145,914 B2 | 3/2012 | Steeves |
| 8,166,562 B2 | 4/2012 | Holvey et al. |
| 8,266,515 B2 | 9/2012 | Satyavolu |
| 8,613,066 B1 | 12/2013 | Brezinski et al. |
| 8,645,264 B2 | 2/2014 | Allison et al. |
| 8,676,611 B2 | 3/2014 | McLaughlin et al. |
| 8,739,260 B1 | 5/2014 | Damm-Goossens |
| 9,106,642 B1 | 8/2015 | Bhimanail |
| 9,430,892 B2 | 8/2016 | Amdahl |
| 9,449,346 B1 | 9/2016 | Hockey |
| 9,595,023 B1 | 3/2017 | Hockey et al. |
| 9,699,187 B2 | 7/2017 | Chen et al. |
| 9,906,520 B2 | 2/2018 | Fouad et al. |
| 10,003,591 B2 | 6/2018 | Hockey et al. |
| 10,104,059 B2 | 10/2018 | Hockey et al. |
| 10,319,029 B1 | 6/2019 | Hockey et al. |
| 2001/0011274 A1 | 8/2001 | Klug et al. |
| 2002/0002596 A1 | 1/2002 | Sugiarto et al. |
| 2002/0065772 A1 | 5/2002 | Saliba et al. |
| 2002/0095588 A1 | 7/2002 | Shigematsu et al. |
| 2003/0023879 A1 | 1/2003 | Wray |
| 2003/0028646 A1 | 2/2003 | Wray |
| 2003/0060896 A9 | 3/2003 | Hulai |
| 2003/0163425 A1 | 8/2003 | Cannon, Jr. |
| 2003/0182035 A1 | 9/2003 | DiLodovico et al. |

(56) References Cited

U.S. PATENT DOCUMENTS

| | | |
|---|---|---|
| 2003/0185370 A1 | 10/2003 | Rosera |
| 2003/0204460 A1 | 10/2003 | Robinson |
| 2005/0027617 A1 | 2/2005 | Zucker et al. |
| 2005/0154913 A1 | 7/2005 | Barriga et al. |
| 2005/0222929 A1 | 10/2005 | Steier et al. |
| 2005/0246269 A1 | 11/2005 | Smith |
| 2006/0015358 A1 | 1/2006 | Chua |
| 2006/0190569 A1 | 8/2006 | Neil |
| 2006/0236384 A1 | 10/2006 | Lindholm et al. |
| 2007/0179942 A1 | 8/2007 | Heggem |
| 2007/0255662 A1* | 11/2007 | Tumminaro ......... G06Q 20/027 705/79 |
| 2007/0289002 A1 | 12/2007 | van der Horst et al. |
| 2008/0051059 A1 | 2/2008 | Fisher |
| 2008/0052192 A1 | 2/2008 | Fisher |
| 2008/0052233 A1 | 2/2008 | Fisher |
| 2008/0162361 A1 | 7/2008 | Sklovsky |
| 2008/0183628 A1 | 7/2008 | Oliver et al. |
| 2008/0243784 A1 | 10/2008 | Stading |
| 2009/0037308 A1 | 2/2009 | Feinstein |
| 2009/0070257 A1 | 3/2009 | Csoka |
| 2009/0222900 A1 | 9/2009 | Benaloh et al. |
| 2009/0245521 A1* | 10/2009 | Vembu ................. G06F 21/606 380/279 |
| 2009/0271847 A1 | 10/2009 | Karjala et al. |
| 2009/0328177 A1 | 12/2009 | Frey et al. |
| 2010/0027552 A1 | 2/2010 | Hill |
| 2010/0185868 A1 | 7/2010 | Grecia |
| 2010/0235882 A1 | 9/2010 | Moore |
| 2011/0196790 A1 | 8/2011 | Milne |
| 2011/0238550 A1 | 9/2011 | Reich et al. |
| 2011/0295731 A1 | 12/2011 | Waldron, III et al. |
| 2012/0209775 A1 | 8/2012 | Milne |
| 2012/0278201 A1 | 11/2012 | Milne |
| 2013/0019297 A1 | 1/2013 | Lawson et al. |
| 2013/0125223 A1 | 5/2013 | Sorotokin et al. |
| 2013/0247005 A1 | 9/2013 | Hirsch et al. |
| 2013/0282577 A1 | 10/2013 | Milne |
| 2013/0318592 A1 | 11/2013 | Grier, Sr. et al. |
| 2014/0040148 A1 | 2/2014 | Ozvat et al. |
| 2014/0044123 A1 | 2/2014 | Lawson et al. |
| 2014/0150072 A1 | 5/2014 | Castro et al. |
| 2014/0165156 A1 | 6/2014 | Fushman et al. |
| 2014/0180962 A1 | 6/2014 | Fiala et al. |
| 2014/0189808 A1 | 7/2014 | Mahaffey et al. |
| 2014/0215551 A1 | 7/2014 | Allain et al. |
| 2014/0245411 A1 | 8/2014 | Meng et al. |
| 2014/0258063 A1 | 9/2014 | Chourasia et al. |
| 2014/0365350 A1 | 12/2014 | Shvarts |
| 2015/0026024 A1 | 1/2015 | Calman et al. |
| 2015/0046338 A1 | 2/2015 | Laxminarayanan et al. |
| 2015/0066719 A1 | 3/2015 | Agrawal et al. |
| 2015/0088707 A1 | 3/2015 | Drury et al. |
| 2015/0161608 A1 | 6/2015 | Gilbert |
| 2015/0254672 A1 | 9/2015 | Huesch et al. |
| 2015/0281225 A1 | 10/2015 | Schoen et al. |
| 2015/0365399 A1 | 12/2015 | Biswas et al. |
| 2016/0063657 A1 | 3/2016 | Chen et al. |
| 2017/0068954 A1 | 3/2017 | Hockey et al. |
| 2017/0070500 A1 | 3/2017 | Hockey et al. |
| 2017/0200234 A1 | 7/2017 | Morse |
| 2019/0014101 A1 | 1/2019 | Hockey et al. |
| 2019/0182233 A1 | 6/2019 | Hockey et al. |

FOREIGN PATENT DOCUMENTS

| | | |
|---|---|---|
| EP | 0 848 339 | 6/1998 |
| EP | 2 747 374 | 6/2014 |
| EP | 3 347 846 | 7/2018 |
| WO | WO 96/38795 | 12/1996 |
| WO | WO 97/10542 | 3/1997 |
| WO | WO 97/09682 | 5/1997 |
| WO | WO 97/26612 | 7/1997 |
| WO | WO 97/37314 | 10/1997 |
| WO | WO 98/14896 | 4/1998 |
| WO | WO 00/25227 | 5/2000 |
| WO | WO 2017/044479 | 3/2017 |

OTHER PUBLICATIONS

"Automatic Notification of Web Sites Changes," Google Groups, Aug. 30, 1995.

"Boeing Chooses NetMind Enterprise Minder to Help Thousands of Employees Track Web-Based Information," PR Newswire, Nov. 19, 1998.

"Caravelle's InfoWatcher 1.1 Keeps an Eye on the Web," PC Week 1997.

"Cognisoft Announces IntelliServ, A Revolutionary Intranet Information Management Application; a Powerful Solution that Enables the Right Information to Find the Right User at the Right Time," Business Wire, p. 8140125, Aug. 14, 1996.

"FirstFloor and AirMedia Announce Partnership," Business Wire 1997 ("FirstFloor").

"Fujitsu Announces 'WebAgent' Application as part of ByeDesk Link Wireless Server Software," Business Wire, Sep. 1, 1998.

"Fujitsu Announces Availability of ByeDesk Link for Alpha-Numeric Pagers; Next Step in Empowering Mobile Workforces with 'Anyplace, Anytime' Information," Business Wire, Jul. 9, 1998.

"Fujitsu Picks NetMind for Wireless Web Agent Software," Computergram International, Sep. 2, 1998.

"Fujitsu's ByeDesk Link Now Available on the PalmPilot," Business Wire, Sep. 21, 1998.

"GC Tech's GlobeID Payment Internet Commerce Software Supports Microsoft, Merchant Server," Business Wire, Jan. 21, 1997, p. 1211286.

"Highly Scalable On-Line Payments via Task Decoupling," Financial Cryptography First International Conference, 1998, p. 355-373.

"Minding Web Site Changes," PC Week, Sep. 14, 1998.

"NetMind Accepts $7 Million Strategic Investment From Three Prominent VC Firms—BancBoston, Softbank and Draper Fisher Jurvestson," PR Newswire, Nov. 6, 1998.

"NetMind Updates the World's Largest Free Web Tracking Service," PR Newswire, Sep. 18, 1998.

"The AT&T Internet Difference Engine: Tracking and Viewing Changes on the Web," World Wide Web 1 (1); Jan. 1998, pp. 27-44.

"Versatile Intelligent Agents in Commercial Applications," Google Groups, Dec. 12, 1998.

"WebEntree: A Web Service Aggregator", Y. Zhao, IBM Systems Journal, vol. 37, No. 4, 1998.

A hierarchical approach to wrapper induction, Ion Muslea, Steve Minton, and Craig A. Knoblock. In Proceedings of the 3rd International Conference on Autonomous Agents 1999, Seattle, WA, 1999. May 1-5,1999.

Building agents for internet-base supply chain integration, Craig A. Knoblock and Steven Minton. In Proceedings of the Workshop on Agents for Electronic Commerce and Managing the Internet-Enabled Supply Chain, Seattle, WA, 1999. May 1-5, 1999.

Hagel et al. "The Coming Battle for Customer Information." Harvard Business Review, Jan.-Feb. 1997, reprint No. 97104.

Hummer, Waldemar, Philipp Leitner, and Schahram Dustdar. "Ws-aggregation: distributed of web services data." Proceedings of the 2011 ACM Symposium on Applied Computing. ACM, 2011.

Intelligent caching for information mediators: A kr based approach, Naveen Ashish, Craig A. Knoblock, and Cyrus Shahabi. In Proceedings of the Workshop on Knowledge Representation meets Databases (KRDB), Seattle, WA, 1998. Presented May 1, 1998.

Johner et al. "Sign on with IBM's Global Sign-On!" IBM manual, Nov. 1998. Part 1, in 184 pages.

Johner et al. "Sign on with IBM's Global Sign-On!" IBM manual, Nov. 1998. Part 2, pp. 166-307.

Modeling web sources for information integration, Craig A. Knoblock, Steven Minton, Jose Luis Ambite, Naveen Ashish, Pragnesh Jay Modi, Ion Muslea, Andrew G. Philpot, and Sheila Tejada. In Proceedings of the Fifteenth National Conference on Artificial Intelligence, Madison, WI, 1998. Jul. 26-30, 1998.

(56) References Cited

OTHER PUBLICATIONS

Optimizing Information Agents by Selectively Materializing Data, Naveen Ashish, Craig A. Knoblock, and Cyrus Shahabi. In Proceedings of the AAAI'98 Workshop on AI and Information Integration, Madison, WI, 1998. Jul. 26-30, 1998.

Part 1 of various documents related to MaxMiles and/or MileageManager, as obtained from *Yodlee Inc.* v. *Plaid Technologies Inc.*, Civil Action No. 14-cv-01445-LPS and/or *Yodlee Inc.* v. *Cashedge Inc.*, Civil Action No. 05-cv-01550-SI. To the best of Applicant's knowledge, MaxMiles and/or MileageManager were products and/or services offered around 1997 or earlier.

Part 10 of various documents related to MaxMiles and/or MileageManager, as obtained from *Yodlee Inc.* v. *Plaid Technologies Inc.*, Civil Action No. 14-cv-01445-LPS and/or *Yodlee Inc.* v. *Cashedge Inc.*, Civil Action No. 05-cv-01550-SI. To the best of Applicant's knowledge, MaxMiles and/or MileageManager were products and/or services offered around 1997 or earlier.

Part 11 of various documents related to MaxMiles and/or MileageManager, as obtained from *Yodlee Inc.* v. *Plaid Technologies Inc.*, Civil Action No. 14-cv-01445-LPS and/or *Yodlee Inc.* v. *Cashedge Inc.*, Civil Action No. 05-cv-01550-SI. To the best of Applicant's knowledge, MaxMiles and/or MileageManager were products and/or services offered around 1997 or earlier.

Part 2 of various documents related to MaxMiles and/or MileageManager, as obtained from *Yodlee Inc.* v. *Plaid Technologies Inc.*, Civil Action No. 14-cv-01445-LPS and/or *Yodlee Inc.* v. *Cashedge Inc.*, Civil Action No. 05-cv-01550-SI. To the best of Applicant's knowledge, MaxMiles and/or MileageManager were products and/or services offered around 1997 or earlier.

Part 3 of various documents related to MaxMiles and/or MileageManager, as obtained from *Yodlee Inc.* v. *Plaid Technologies Inc.*, Civil Action No. 14-cv-01445-LPS and/or *Yodlee Inc.* v. *Cashedge Inc.*, Civil Action No. 05-cv-01550-SI. To the best of Applicant's knowledge, MaxMiles and/or MileageManager were products and/or services offered around 1997 or earlier.

Part 4 of various documents related to MaxMiles and/or MileageManager, as obtained from *Yodlee Inc.* v. *Plaid Technologies Inc.*, Civil Action No. 14-cv-01445-LPS and/or *Yodlee Inc.* v. *Cashedge Inc.*, Civil Action No. 05-cv-01550-SI. To the best of Applicant's knowledge, MaxMiles and/or MileageManager were products and/or services offered around 1997 or earlier.

Part 5 of various documents related to MaxMiles and/or MileageManager, as obtained from *Yodlee Inc.* v. *Plaid Technologies Inc.*, Civil Action No. 14-cv-01445-LPS and/or *Yodlee Inc.* v. *Cashedge Inc.*, Civil Action No. 05-cv-01550-SI. To the best of Applicant's knowledge, MaxMiles and/or MileageManager were products and/or services offered around 1997 or earlier.

Part 6 of various documents related to MaxMiles and/or MileageManager, as obtained from *Yodlee Inc.* v. *Plaid Technologies Inc.*, Civil Action No. 14-cv-01445-LPS and/or *Yodlee Inc.* v. *Cashedge Inc.*, Civil Action No. 05-cv-01550-SI. To the best of Applicant's knowledge, MaxMiles and/or MileageManager were products and/or services offered around 1997 or earlier.

Part 7 of various documents related to MaxMiles and/or MileageManager, as obtained from *Yodlee Inc.* v. *Plaid Technologies Inc.*, Civil Action No. 14-cv-01445-LPS and/or *Yodlee Inc.* v. *Cashedge Inc.*, Civil Action No. 05-cv-01550-SI. To the best of Applicant's knowledge, MaxMiles and/or MileageManager were products and/or services offered around 1997 or earlier.

Part 8 of various documents related to MaxMiles and/or MileageManager, as obtained from *Yodlee Inc.* v. *Plaid Technologies Inc.*, Civil Action No. 14-cv-01445-LPS and/or *Yodlee Inc.* v. *Cashedge Inc.*, Civil Action No. 05-cv-01550-SI. To the best of Applicant's knowledge, MaxMiles and/or MileageManager were products and/or services offered around 1997 or earlier.

Part 9 of various documents related to MaxMiles and/or MileageManager, as obtained from *Yodlee Inc.* v. *Plaid Technologies Inc.*, Civil Action No. 14-cv-01445-LPS and/or *Yodlee Inc.* v. *Cashedge Inc.*, Civil Action No. 05-cv-01550-SI. To the best of Applicant's knowledge, MaxMiles and/or MileageManager were products and/or services offered around 1997 or earlier.

Semi-automatic wrapper generation for Internet information sources, Naveen Ashish and Craig A. Knoblock. In Proceedings of the Second IFCIS International Conference on Cooperative Information Systems, Kiawah Island, SC, 1997. Jun. 24-27, 1997.

"Web Interface Definition Language (WIDL)", W3 Consortium submission from webMethods, Inc., Sep. 22, 1997.

The ariadne approach to web-based information integration, Craig A. Knoblock and Steven Minton. IEEE Intelligent Systems, 13(5), Sep./Oct. 1998.

WebVCR product bulletin and documentation, NetResults Corporation, 1996. We understand that, with respect to issues raised by this litigation, the WebVCR product as available in 1996 provided substantially the same functionality as is described at http://www.n2r6.com/fs_webvcr_info.html.

WebVCR web service, which is described by at least the following references: The WebVCR product bulletin and documentation, NetResults Corporation, 1996 and http://www.n2r6.com/fs_webvcr_info.html.

Wrapper generation for semi-structured Internet sources, Naveen Ashish and Craig A. Knoblock. In Proceedings of the Workshop on Management of Semistructured Data, Tucson, AZ, 1997. May 13-15, 1997.

Wrapper induction for semistructured, web-based information sources, Ion Muslea, Steven Minton, and Craig A. Knoblock. In Proceedings of the Conference on Automated Learning and Discovery Workshop on Learning from Text and the Web, Pittsburgh, PA, 1998. Jun. 11-13, 1998.

Kyeongwon C., et. al., 'A Mobile based Anti-Phishing Authentication Scheme using QR code', IEEE International Conference on Mobile IT Convergence, pp. 109-113, 2011.

Kim, Young-Gon et. al., 'A Design of User Authentication System Using QR code Identifying Method', 6th International Conference on Computer Sciences and Convergence Information Technology (ICCIT), pp. 31-35, 2011.

International Search Report in PCT Application No. PCT/US2016/050536, dated Dec. 15, 2016.

U.S. Appl. No. 16/396,505, System and Method for Programmatically Accessing Financial Data, filed Apr. 26, 2019.

U.S. Appl. No. 16/003,640, Secure Permissioning of Access to User Accounts, Including Secure Deauthorization of Access to User Accounts, filed Jun. 8, 2018.

U.S. Appl. No. 16/113,323, Secure Permissioning of Access to User Accounts, Including Secure Deauthorization of Access to User Accounts, filed Aug. 27, 2018.

O'Riain et al., "XBRL and open data for global financial ecosystems: A linked data approach." International Journal of Accounting Information Systems 13.2 (2012): 141-162.

Corena et al., "Secure and fast aggregation of financial data in cloud-based expense tracking applications." Journal of Network and Systems Management 20.4 (2012): 534-560.

Supplementary European Search Report in EP Application No. 16844973.4, dated Jan. 4, 2019.

Examination Report in CA Application No. 2997115, dated Jun. 20, 2019.

U.S. Appl. No. 14/790,897, System and Method for Facilitating Programmatic Verification of Transactions, filed Jul. 2, 2015.

U.S. Pat. No. 9,449,346, System and Method for Programmatically Accessing Financial Data, dated Sep. 20, 2016.

U.S. Pat. No. 9,595,023, System and Method for Facilitating Programmatic Verification of Transactions, dated Mar. 14, 2017.

U.S. Appl. No. 15/258,299, System and Method for Programmatically Accessing Financial Data, filed Sep. 7, 2016.

U.S. Appl. No. 15/258,256, Secure Permissioning of Access to User Accounts, Including Secure Deauthorization of Access to User Accounts, filed Sep. 7, 2016.

U.S. Appl. No. 15/258,262, Secure Permissioning of Access to User Accounts, Including Secure Deauthorization of Access to User Accounts, filed Sep. 7, 2016.

U.S. Appl. No. 15/159,714, Parameter-Based Computer Evaluation of User Accounts Based on User Account Data Stored in One or More Databases, filed May 19, 2016.

(56) References Cited

OTHER PUBLICATIONS

U.S. Appl. No. 15/160,663, Systems and Methods for Estimating Past and Prospective Attribute Values Associated With a User Account, filed May 20, 2016.

* cited by examiner

NEW USER WITH STATE SUBMIT

```
curl -X POST https://bankAPI.example/auth \
 -d client_id={CLIENT_ID} \
 -d secret={SECRET} \
 -d credentials='{
    "username":"plaid_test",
    "password":"plaid_good",
    "state":"tx"}' \
 -d type={TYPE}
```

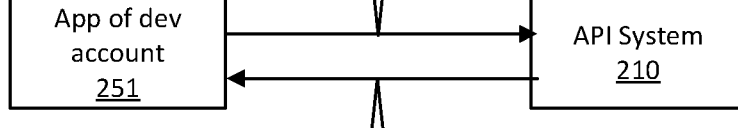

AUTH RESPONSE

```
http code 200
{"accounts": [{
    "_id": "52db1be4be13cbXXXXXXXXXX",
    "_item": "52af631671c3bdXXXXXXXXXX",
    "_user": "52af630f71c3bdXXXXXXXXXX",
    "balance": {
     "available": 1400,
     "current": 1230
    },
    "meta": {
     "name": "My Savings",
     "number": "31015"
    },
    "numbers": {
     "routing": "0000000",
     "account": "1111111",
     "wireRouting": "2222222"
    },
    "institution_type": "chase",
    "type": "depository",
    "status": "normal",
  },
 ...], "access_token": "xxxxx"}
```

FIGURE 3

NEW USER WITH STATE SUBMIT

```
curl -X POST https://bankAPI.example.com/transaction \
 -d client_id={CLIENT_ID} \
 -d secret={SECRET} \
 -d transaction='{
    "withdrawal_account_token":"jasdlkfjio34i29",
    "deposit_account_token":"Bjsklaidf9djanjk",
    "amount":"515.15"}' \
 -d type={TYPE}
```

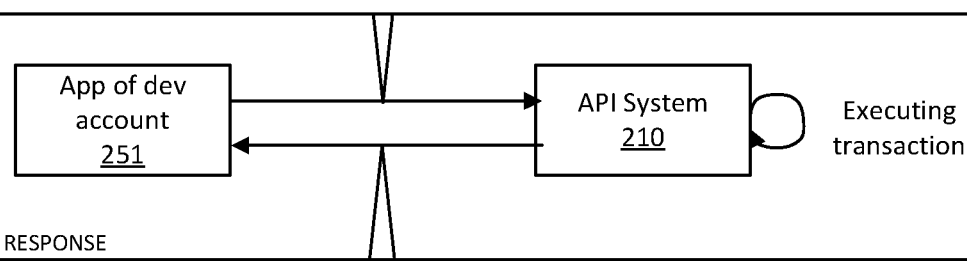

AUTH RESPONSE

```
http code 200
{"transaction": [{
    "_id": "52db1be4be13cbXXXXXXXXXX",
    "status": "processing",
  },
 ...], "transaction_access_token": "xxxxx"}
```

FIGURE 4

Dev Account B Proxy Instance User A Bank 1 621

Dev Account B User: "User A"
Institution: "Bank 1 541"
Credentials: <User A Credentials Bank 1>
Properties: <User A Properties Bank 1>

Dev Account B Proxy Instance User A Bank 2 622

Dev Account B User: "User A"
Institution: "Bank 2 542"
Credentials: <User A Credentials Bank 2>
Properties: <User A Properties Bank 2>

Dev Account B Proxy Instance User B Bank 2 623

Dev Account B User: "User B"
Institution: "Bank 2 542"
Credentials: <User B Credentials Bank 2>
Properties: <User B Properties Bank 2>

Dev Account A Proxy Instance User C Bank 1 624

Dev Account A User: "User C"
Institution: "Bank 1 541"
Credentials: <User C Credentials Bank 1>
Properties: <User C Properties Bank 1>

Dev Account A Proxy Instance User C Bank 2 625

Dev Account A User: "User C"
Institution: "Bank 2 542"
Credentials: <User C Credentials Bank 2>
Properties: <User C Properties Bank 2>

FIGURE 7

SYSTEM AND METHOD FOR FACILITATING PROGRAMMATIC VERIFICATION OF TRANSACTIONS

CROSS-REFERENCE TO RELATED APPLICATIONS

This application is a continuation of U.S. patent application Ser. No. 14/790,897, filed 2 Jul. 2015, which application is a continuation of U.S. patent application Ser. No. 14/719,117, filed 21 May 2015, which claims the benefit of U.S. Provisional Application Ser. No. 62/001,461, filed on 21 May 2014, which is incorporated in its entirety by this reference.

TECHNICAL FIELD

This invention relates generally to the financial transaction field, and more specifically to a new and useful system and method for facilitating programmatic verification of transactions in the financial transaction field.

BACKGROUND

Despite various technologies and services providing various financial transaction services and tools, traditional ACH transfers remain a common mechanism for transferring funds between two accounts. Such transfers however, have numerous problems. As a first problem, the user experience requires a user to provide account number and routing number information. This is a cumbersome task for users who frequently do not know this information and may not have the proper documents to access such information. Additionally, the entering of such information is very error prone and can lead to failed transfer, which can result in financial repercussions for one if not more parties involved in the transaction. Beyond that, a common approach to verifying account ownership includes the use of micro-deposits. The micro-deposit adds significant delays to transferring funds and can additionally be a slow and confusing process for involved parties. Thus, there is a need in the financial transaction field to create a new and useful system and method for facilitating programmatic verification of transactions. This invention provides such a new and useful system and method.

BRIEF DESCRIPTION OF THE FIGURES

FIGS. 3 and 4 are variations of API request and response flows of the system;

FIG. 7 is a representation of exemplary proxy instances of an embodiment;

DESCRIPTION OF THE PREFERRED EMBODIMENTS

The following description of preferred embodiments of the invention is not intended to limit the invention to these preferred embodiments, but rather to enable any person skilled in the art to make and use this invention.

1. METHOD FOR FACILITATING PROGRAMMATIC VERIFICATION OF TRANSACTIONS

Figure 1:
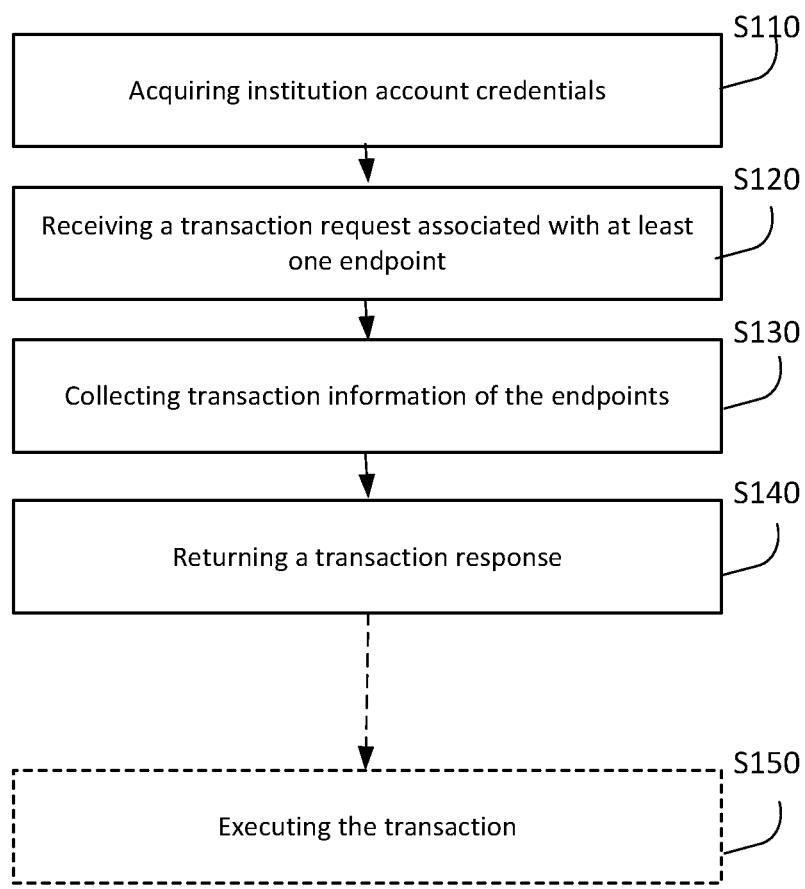
FIG. 1 is a flow chart representation of a method for facilitating programmatic verification of transactions.

As shown in FIG. 1, a method for facilitating programmatic verification of transactions of a preferred embodiment can include acquiring institution account credentials S110, receiving a transaction request associated with at least one endpoint S120, collecting transaction information of the endpoint S130, and returning a transaction response S140. In some embodiments, the method can include executing the transaction S150, which functions to process the transaction between two endpoints. In some embodiments, the method does not perform execution of the transaction, receiving the transaction request functions to initiate the retrieval of transaction addressing information of the at least one endpoint, collecting transaction information of the endpoint includes collecting transaction addressing information of the endpoint, and returning a transaction response functions to transmit the collected transaction addressing information of the endpoint. The method functions to leverage account access during the transaction process. Variations of the method can be used to add functionality such as verifying account information used in financial transfers, programmatically transferring funds, setting programmatic events, catching errors and fraud, performing conditional processing of a transaction, and/or other suitable operations. The method is preferably used within a financial API platform that provides features related to programmatic financial transaction. Preferably, the financial transactions are automated clearing house (ACH) transactions, but any suitable type of transaction may be used. In a first preferred implementation, the method provides an API resource whereby developers can obtain verified ACH endpoint information. The account number and routing number are obtained as well as verification of ownership of the account. In this variation, the method uses the information to execute the transaction. In another embodiment, the method additionally executes the transaction having obtaining the required information and verification. The method is preferably performed by a system such as the one described below (e.g., the system 200 of FIG. 2), but the method may alternatively be implemented by any suitable system.

Figure 2:
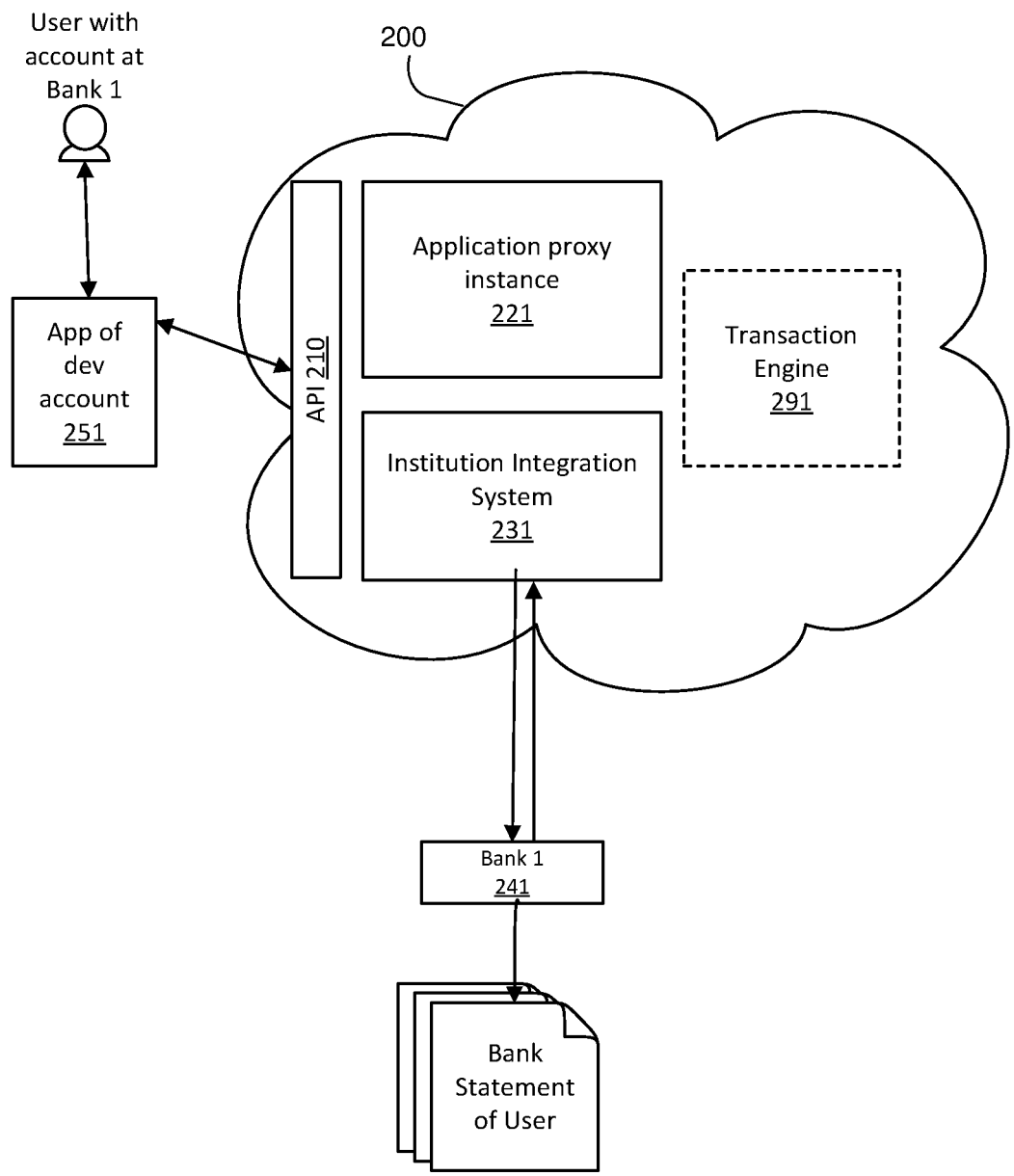
FIG. 2 is a schematic representation of a system of an embodiment.

Block S110, which includes acquiring institution account credentials, functions to obtain login information for a financial institution (e.g., the financial institution 241 of FIG. 2). The institution account credentials preferably include a username and password. The account is preferably an account of an external financial institution. Additionally, an institution may include additionally authentication challenges such as a pin code, security questions, single-use passwords, secondary device code verification, biometric identification, and/or any suitable form of multi-factor authentication (MFA). Such additional authentication challenges may be collected at the same time of the account credentials, but the MFA authentication process may alternatively be defined in the API protocol. For example, if the primary account credentials are not sufficient, the MFA challenge may returned in a response, this additional credential request can be repeated as required before access to the account is obtained. The institution account credentials can additionally be stored, and automatically used to complete subsequent access or login attempts.

The account credentials are preferably provided through an API request of a developer or application account. The API is preferably used in establishing, setting up, or enrolling a new user account. One end user will preferably have at least one associated financial account, but may be linked or associated with multiple financial accounts. Account credentials are preferably obtained for each financial account.

Block S120, which includes receiving a transaction request associated with at least one endpoint, functions to initiate the retrieval of transaction addressing information of an endpoint. The endpoint is preferably a transaction endpoint, which may be any suitable endpoint from which funds may be withdrawn or deposited. In a common transaction, there is a single withdrawal account and a single deposit account. The method can be used in obtaining information for one or more endpoints. In some variations, there may be a plurality of withdrawal and/or deposit accounts. In one variation, the transaction request is identical to an enroll user request used to obtain the user credentials of block S110. The account credentials may alternatively be previously obtained or obtained in response to the transaction request.

In one variation, the transaction request is for information about an account, the API request preferably specifies an institution and account credentials. Additional credentials may additionally be required such as a pin code, state in which an account was created, or MFA challenge answers. A second request with similar parameters may be submitted to obtain the account credentials for other involved transaction endpoints.

In another variation, the transaction request may explicitly define the transaction details. The transaction request preferably includes at least one withdrawal account endpoint and deposit account endpoint. Account credentials are preferably specified for each endpoint. In one variation, a single API request may include account credentials for both endpoints. In another variation, a transaction resource is used, such that withdrawal endpoint information, deposit account information, and transaction details can be specified asynchronous. For example, a transaction resource is created through an API request. Later, an API request hits the new transaction resource (by specifying a transaction identifier) to specify withdrawal information, then deposit information, and then the amount to be transferred. Once all the information is populated, the transaction may be executed either automatically, in response to an executed command, or scheduled for a later time. Bulk, aggregate, or group transactions may additionally be specified in a request. If multiple entities are withdrawal endpoints, then the division of funds may be specified (e.g., a percentage breakdown or amount break down). Similarly, funds for multiple deposit endpoints may be specified.

Block S130, which includes collecting transaction information of the endpoint, functions to access and determine properties of a transaction endpoint. Collecting transaction information of the endpoint preferably involves using the account credentials to gain account access in a financial institution. Preferably, the account access is facilitated by using a proxy application, which simulates an application accessing the system of an external institution such as in the system and method described in U.S. Provisional Application No. 62/001,452, filed on 21 May 2014, which is hereby incorporated in its entirety by this reference. The proxy application preferably appears as a first party application instance of the institution, but is actually programmatically controlled communication of the system. The headers, body, encryption, communication protocol negotiation are preferably configured to approximate application communication. The account access can be used to request and obtain account documents that include endpoint information. The account documents may include bank statements or other suitable documents. If the documents are in pdf or other alternative formats, the content is preferably scraped to identify transaction information.

Block S130, which includes collecting transaction information of the endpoint, preferably includes collecting transaction addressing information of the endpoint. The account addressing information is preferably the account number and the routing number of an account. Billing address, wire routing number, and/or other account information can additionally be pulled. In one variation, the account number and routing number are available in banking statements. An extraction script may be used to pull the document and then isolate the information from the document. Accessing the account number and the routing number in an automated fashion preferably avoids chances of error. As a first benefit, access to the account provides evidence of that the owner of the account participated in providing the transaction endpoint information. As another benefit, the information is automatically pulled, which avoids human error.

Collecting transaction information of the endpoint S130 may additionally include collecting transaction status information of the endpoint, which can include indication of fund requirements, account fraud checks, and other status information. Various stages can be built into providing the transaction information, which provide different safeguards and/or features into financial transactions.

In a first optional stage, the transaction status information can determine a sufficient funds status. The sufficient funds status is preferably applied to a withdrawal account to ensure that the account has funds to complete the transaction. Transaction history and/or current fund value may be accessed through the account access. In one variation, the fund amount is returned in the response such that the developer/application can respond appropriately. In another variation, the transaction amount is compared to available funds. If sufficient funds are not found, then an error or warning may be raised.

In another optional stage, the account may be processed for fraud patterns. For example, the age of the account may be accessed. Newly created accounts may be less trustworthy than established accounts with significant history. Similarly transaction history may be assessed for fraudulent behavior. If the account is used for a diverse range of transactions indicative of normal behavior then the account may be identified as normal. If the account only participates in repeated high value transactions or other fraud patterns, then the account may be flagged as fraudulent. Additionally, the entities involved in the transaction may be indicative of fraud.

The method may additionally include verifying transaction conditions during one or more stage. Transaction conditions may be used to take any suitable action. The available actions can include permitting a transaction or preventing a transaction. Additionally, the action can include sending a notification. The notification can include an email, text message, a platform message, a phone call, or any suitable notification. The action may additionally include triggering a programmatic event. In one variation the programmatic event is a callback event, wherein and HTTP message is sent to a destination. Conditions may be customized or selected from a set of provided conditions. Exemplary conditions can include a condition that triggers a notification for transactions over a particular amount; a condition based on available funds after the transaction to alert a user to funds below a threshold; and a condition based on the frequency of transactions or the entities involved in the transaction account. Conditions can be scoped for a developer account, a particular institution account, or for any suitable scope of entities.

Block S140, which includes returning a transaction response functions to transmit the results of the transaction request. The transaction response is preferably made in a synchronous API message that is sent in response to an initial request. Alternatively, a status API resource may be used such that an application/service can periodically check the status API resource to determine the processing status and/or the results. Alternatively, any suitable approach may be used to provide the results to the initial request.

In one preferred implementation, the response provides the addressing information used for a financial endpoint. If there are no errors or warnings with respect to the account, then account information is preferably NACHA compliant as the financial endpoint information was accessed and obtained in a manner that validates the ownership of the account (e.g., by providing credentials and optionally multi-factor authentication responses). The transaction response can include the account number, the routing number, and/or any additional information for the endpoint that is used in executing the transaction. The transaction response may additionally include the available funds, such that the requesting entity can check for sufficient funds. The response may additionally indicate if sufficient funds are available if the transaction amount was provided, which functions to hide the available funds from the requesting entity while preventing overdraft transaction. The transaction response can additionally include other fields such as a status field, where the account may be labeled according to any categorization of the account. For example, the status may indicate that the account is normal or fraudulent.

Additionally or alternatively, the method can include executing the transaction S150, which functions process the transaction between two endpoints. In this variation a request to execute a transaction between at least two endpoints is received. Additionally, returning a transaction response may include returning results of the transaction in the response. In another preferred implementation, the method includes executing the transaction. The transaction response can include information about the status of the transaction when the transaction is submitted, being processed, and/or completed. Transactions may not be instantaneous, and as such the initial transaction response may indicate if the transaction was successfully initiated. Successfully initiated means that the transaction endpoint information was successfully retrieved, that any conditional stages (such as a sufficient funds stage, a fraud-check stage, and custom conditions) are satisfied. A subsequent response or status resource may be updated that reflects the status of the transaction. A transaction resource may be updated with a pending process, when the transaction is initiated and proceeding normally. The transaction resource can be updated with a completed status possibly indicating the time of completion. If an error or issue is encountered, the status of the transaction resource may be updated to reflect the error or issue. The method may additionally include monitoring status of transaction and triggering programmatic event according to the status.

In one variation, executing the transaction can include establishing proxy accounts in at least two institutions, and expediting transactions between the two institutions through a an internal deposit to a first proxy account in a first institution and a second internal deposit from a second proxy account in the second institution. In some cases, transactions between institutions are slower than transactions made within an institution. By establishing cross institution account network, transactions can be facilitated between two accounts in different institutions with similar speeds of internal transactions. The proxy accounts preferably include a funds reserve, which may be periodically balanced between proxy accounts to maintain an operational reserve of funds.

Additionally, the method may be applied to create an abstraction between a user and the underlying account. A transaction endpoint can be abstracted to a user entity, which may be associated with multiple optional transactional endpoints (e.g., different bank accounts). Accordingly, the method may include selecting a financial institution, which functions to dynamically select a connected financial account to participate in a transaction. Various conditions may be set to respond to events when receiving a transaction request, collecting information for the transaction, and/or executing a transaction. In one variation, one financial institution is set as a primary account and another account managed by the same entity is set as a secondary account. If the primary account is not able to complete a transaction, the method preferably detects an error condition and automatically fails over to the secondary account. In another variation, a set of accounts may be preconfigured to be used depending on properties of the request. In combination with the proxy transfer endpoint, the identifying information for the proxy endpoint can be used, but the underlying service automatically will use an automatically selected financial account to use for the funds. For example, a set of entities and/or category of entities/transactions may be set to use particular accounts. Similarly, transactions to one proxy account may be automatically split into transactions with multiple associated accounts. For example, an account holder may set a proxy account to automatically split deposits between two accounts in a 30/70 balance.

2. SYSTEM FOR FACILITATING PROGRAMMATIC VERIFICATION OF TRANSACTIONS

As shown in FIG. 2, a system 200 for facilitating programmatic verification of transactions of a preferred embodiment can include an API system 210 and institution integration 231. The system 200 functions to provide an interface for applications and services that can facilitate the process of transferring funds. The system 200 can more particular function to provide verified account information used in ACH transfers, to execute transfer of funds, to enable programmatic events during transfer process, to mitigate risk and errors, and/or provide alternative financial transaction functionality. As a primary implementation, the system 200 is part of a larger financial API platform, which may provide an application programming interface (API) to financial information. In some variations, the system 200 is part of a multi-tenant API platform that enables a plurality of developers to create accounts and build applications and/or services that leverage the API of the financial API platform. In alternative variations, the system 200 is part of a single-tenant API platform and may provide an internal API for a dedicated set of products or services. For example, a product may be built on top of the financial API platform that enables end users to create accounts to manage finances with one or more financial institutions (banks, credit card companies, investment managers, etc.).

The API service 210 functions to provide an interface for accessing financial institution transaction endpoint information. The API service 210 can additionally provide normalized customer/user facing interface. In one preferred implementation the API service 210 can be substantially similar to the API service and system described in U.S. Provisional Application No. 62/001,452, incorporated above. Preferably the API service 210 leverages an application proxy instance 221, which simulates a proprietary native application accessing a closed API of a financial institution (e.g., the financial institution 241 of FIG. 2). The system 200 can include additional components or services that particularly facilitate the access of information relating to a financial transaction endpoint. For example, a service, script, or module can be configured to access statements or other suitable documents that can contain endpoint information such as account number and routing number information. The statements or information may be contained in pdf or other suitable document formats. The system 200 can include document readers that can access and extract the requested information from the statements.

The API service 210 is preferably a RESTful API but may alternatively be any suitable API such as SOAP or custom protocol. The RESTful API works according to an HTTP request and response model. HTTP requests (or any suitable request communication) to the communication platform preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service 210 can include various resources, which act as mechanisms for specifying requested information or requesting particular actions. The resources can be expressed as URI's or resource paths. The RESTful API resources can additionally be responsive to different types of HTTP methods such as GET, PUT, POST and/or DELETE. Alternative implementations may use an internal interface and provide a user-facing interface such as a graphical user interface in a web application or native application.

In one variation, the API service 210 allows an API request to specify an account, and a response output provides the information related to executing a transaction with the endpoint. In one exemplary implementation, the API service 210 can include at least one API resource for interacting with transaction endpoint. As shown in FIG. 3, an endpoint information request can include institution credentials of an account. The credentials can include username and password. The API protocol can additionally provide a mechanism for completing multi-factor authentication challenges such as security questions, or code-based multi-factor authentication. The API request may additionally include other properties such as developer account identifiers, API authentication tokens, institution type identifiers, and other suitable parameters. The response is preferably a data object that includes at least automatically obtained information such as tracking number, routing number, and/or wire routing number. Additional response information can include funds amount (or alternatively a Boolean indicator of if the funds are sufficient), an account status (e.g., is the account fraudulent, trusted, etc.), billing address of the account, name of the institution, type of account (e.g., saving, depository, etc.), and other suitable properties. Other API properties or features can include a mechanism to specify if endpoint information is requested or if the transaction should be executed.

An institution interface module (institution integration system) (e.g., 231 of FIG. 2) functions to model the internal interface of at least one application with an external institution (e.g., 241). The account credentials of a financial institution account (and optionally multi-factor authentication credentials) can be used for an application proxy to gain access to an institution through the institution interface module. An institution interface module is preferably established for each institution (e.g., 241) with which the system 200 can interface. For example, an institution interface module may exist for each bank and/or credit card company that is available in the system. The institution interface module (e.g., 231) is preferably a set of rules and processes of a particular institution. The institution interface module preferably includes a proxy sub-module that defines how the institution recognizes and/or authenticates a particular application. Some banks may depend on the MAC address of a device; some depend on asymmetric cryptography tokens; while others may generate encrypted tokens. The proxy sub-module is preferably used in establishing the proxy instance information. The institution interface module can additionally include institution protocol sub-module, which defines a mapping between provided API functionality and the form and mode of communication with the external institution. The institution protocol sub-module can define the headers, body, and other properties of messages sent to the associated institution. The protocol sub-module may additionally define how data should be processed to form that message. In some cases, the data may be encrypted in a standard or proprietary format, which the protocol sub-module can define. Additionally, the protocol sub-module can define the communication flow to fulfill a request. In some cases, multiple requests may need to be made to complete a request objective. Other aspects of dealing with an interface of an external institution may additionally be built into the institution interface module such as multi-factor authentication rules. An institution interface module (e.g., 231) is preferably constructed based on use of an actual application (e.g., the application 553 of FIG. 5). The communication and/or the source code can be parsed and analyzed to establish some or all of an institution interface module.

The system 200 may additionally include a transaction engine 291, which can facilitate the transfer of funds between two accounts. The transaction engine 291 can be integrated with the API service 210, such that an API request can direct the execution of a transaction. The transaction engine 291 preferably can execute ACH transactions, but may alternatively or additionally use other financial tools to withdrawal funds and/or deposit funds. With a transaction engine, transactions can be executed between two accounts that have been configured with account credentials, the API response may include the status of the transaction, transaction errors, a status URI or any suitable response to facilitate executing a transaction as shown in FIG. 4. In one variation, proxy accounts can be used in different institutions. With sufficient reserves, transfers between institutions can be expedited by transferring funds to and from the proxy accounts, and then asynchronously updating the proxy accounts.

The system 200 can additionally include other components such as a messaging/notification system, which can manage alerts and/or triggering programmatic events (e.g., callbacks). The system 200 may additionally or alternatively include any suitable components

3. FINANCIAL PLATFORM SYSTEM

Figure 5:
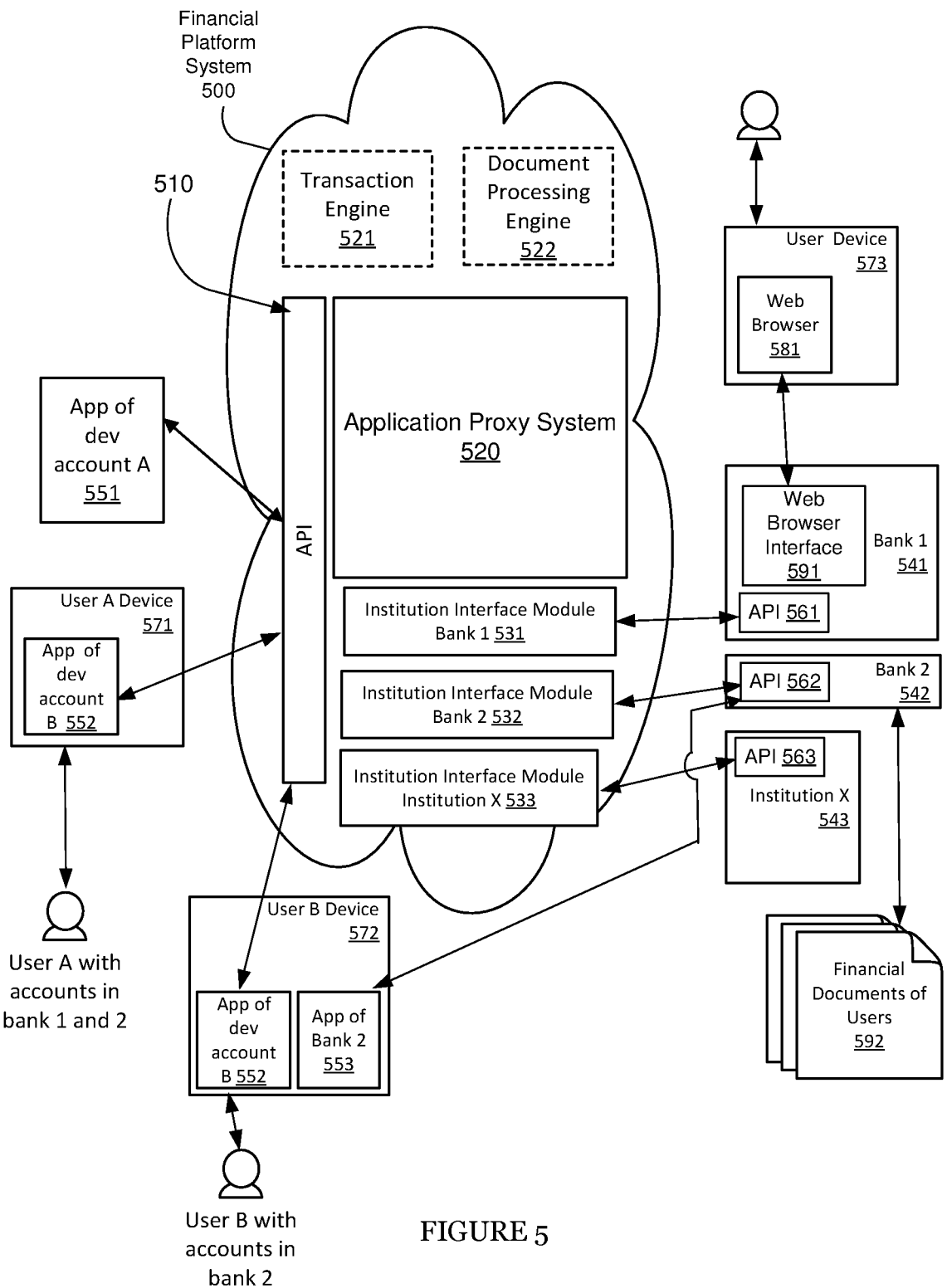
FIG. 5 is a schematic representation of a system of an embodiment.

As shown in FIG. 5, a multi-tenant financial platform system 500 of an embodiment includes an application programming interface (API) service 510, an application proxy system 520, and at least one institution interface module (e.g., the modules 531-533 of FIG. 5). The API service 510 is similar to the API service 210 FIG. 2. The application proxy system 520 includes application proxy instances similar to the application proxy instance 221 of FIG. 2. The institution interface modules 531-533 of FIG. 5 are similar to the institution interface module 231 of FIG. 2.

In some implementations, the financial platform system 500 includes a transaction engine 521. In some implementations, the transaction engine 521 is similar to the transaction engine 291 of FIG. 2.

In some implementations, the financial platform system 500 includes a document processing engine 522. In some implementations, the document processing engine 522 is constructed to process financial documents (e.g., the financial documents 592) of a financial institution system (e.g., 542) of a user account of the financial institution system to identify transaction information. In some implementations, in a case where the financial documents are in a PDF format, the document processing engine 522 is constructed to scrape content of the PDF financial documents to identify the transaction information. In some implementations, the document processing engine 521 is an extraction script that is constructed to pull the financial document and then isolate the transaction information from the document (e.g., as described above for block S130 of FIG. 1). In some implementations, the financial platform system 500 accesses the financial document, stores the accessed financial document (e.g., in a memory 1122 of FIG. 11, a storage medium 1105 of FIG. 1*i*, and the like, of the financial platform system 500), and then controls the document processing engine to process the stored financial document to identify the transaction information.

Figure 8:
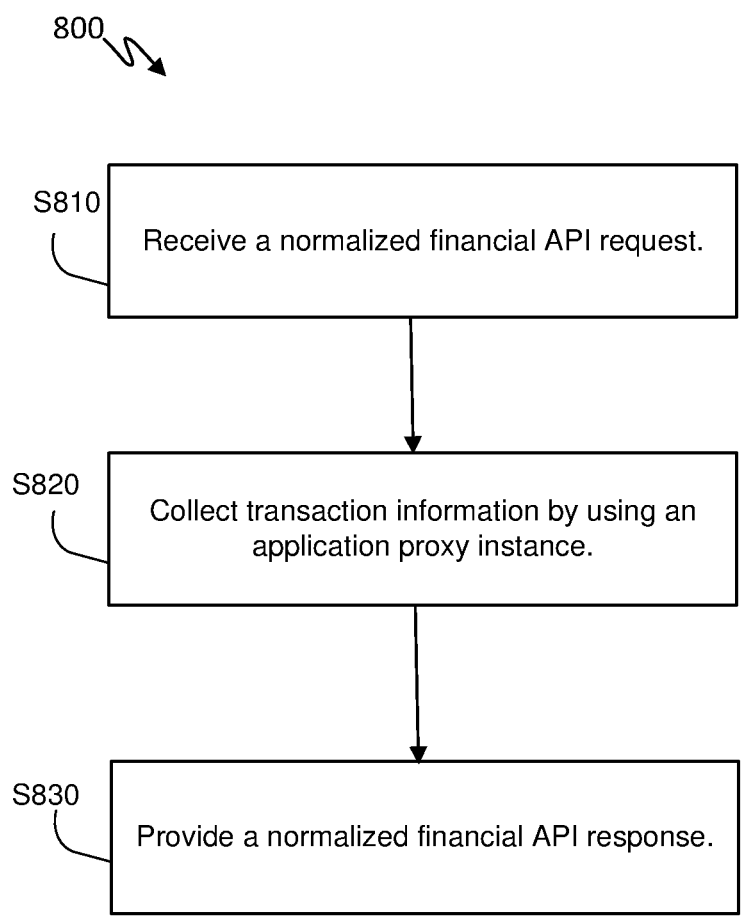
FIG. 8 is a flow diagram of a method of an embodiment.
Figure 9:
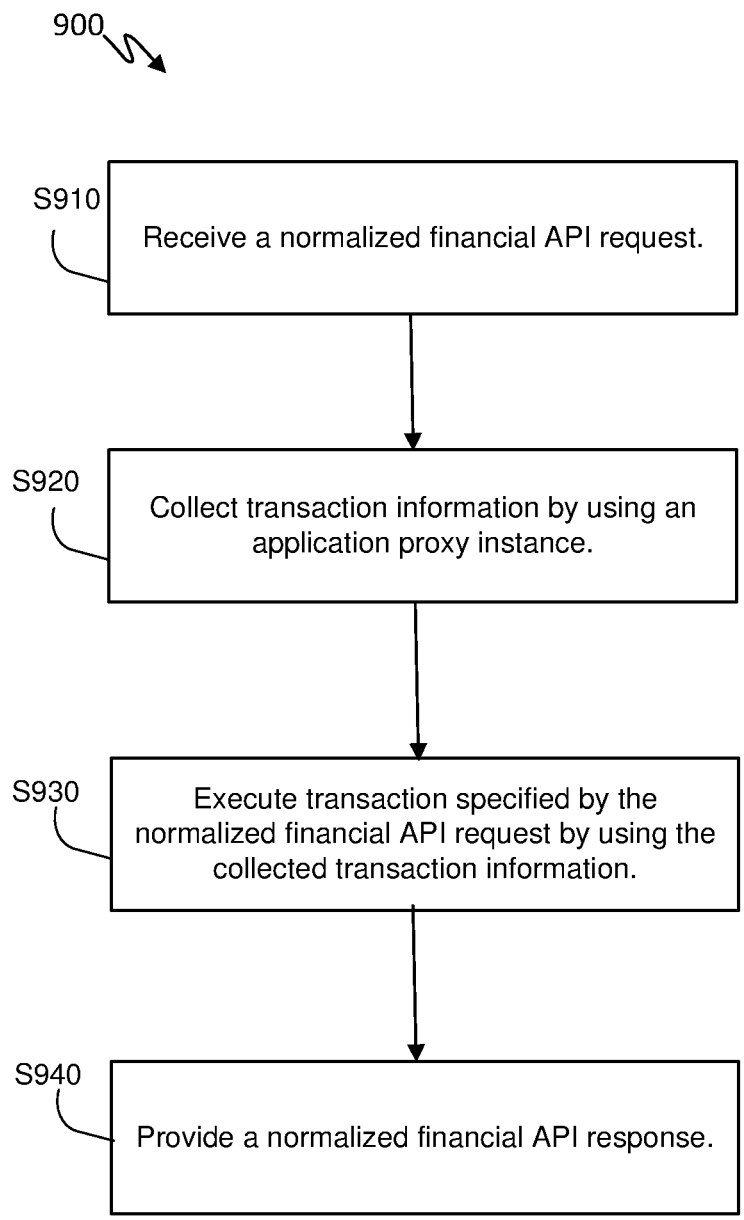
FIG. 9 is a flow diagram of a method of an embodiment.
Figure 10:
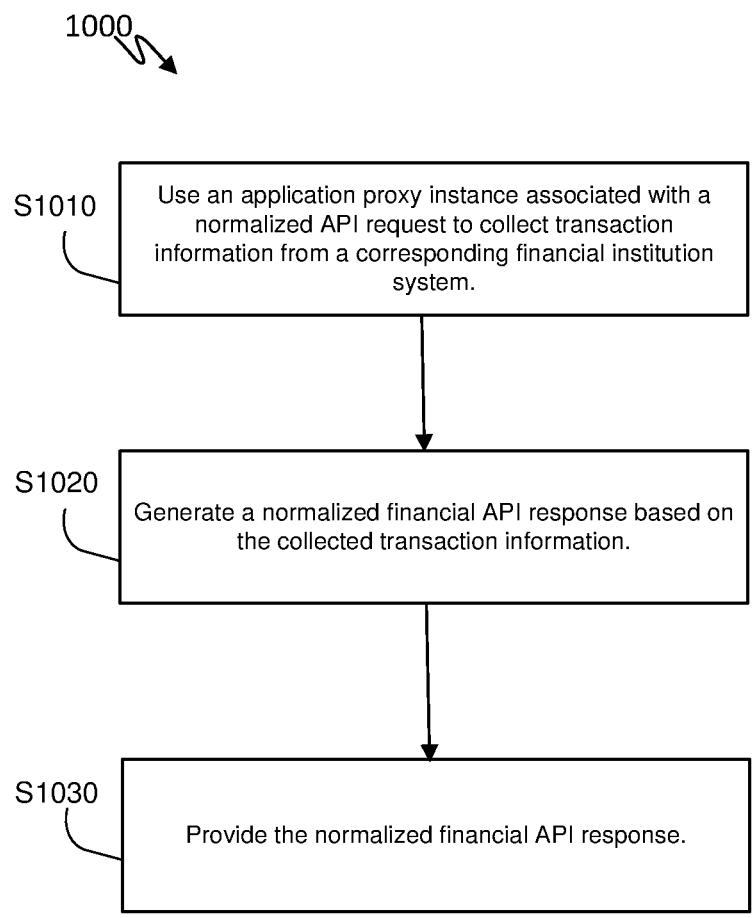
FIG. 10 is a flow diagram of a method of an embodiment.

As shown in FIG. 5, the financial institution system 541 includes a public Web browser interface 591 for accessing the financial institution system 541 via a Web Browser (or any suitable Web client) (e.g., the web browser 581 of the user device 573). As described below for FIGS. 8-10, the methods of FIGS. 8-10 provide access to the financial institution system 541 via a private, proprietary API (e.g., 561), as opposed to access via the public Web browser interface 591. In some implementations, the Web browser interface 591 is a web server that hosts a web site for access of the financial institution system via a Web browser over the Internet.

As shown in FIG. 5, the application proxy system 520 includes application proxy instances (e.g., proxy instances 621-625) for user accounts (e.g., user accounts 611, 612 and 613) of developer accounts (e.g., Dev Account B 631 and Dev Account A 632) at the financial platform system 500. The application proxy system 520 includes an application proxy instance management module 641 that is constructed to generate application proxy instances, configure application proxy instances, and remove application proxy instances.

In some implementations, each application proxy instance (e.g., proxy instances 621-625) specifies the developer account, the user account of the developer account, the associated financial institution system, and credentials of the user account for the financial institution system, as shown in FIG. 7. In some implementations, some application proxy instances specify at least one token for access to a respective financial institution system. In some implementations, the financial institution system provides the application proxy instance with a token for access to the financial institution system after establishment of a session between the application proxy instance and the financial institution system by using the credentials of the user account for the financial institution system. In some implementations, each application proxy instance specifies properties of the application proxy instance. In some implementations, properties include one or more of a unique user identifier code, an authentication token, a MAC address (e.g., a MAC address of a user device 571-572), or any suitable information.

In some implementations, each proprietary API (e.g., 561-563) is different from a web browser interface (e.g., 591) used by a web browser (e.g., 581).

3.1 Multi-Tenant Financial Platform System

As shown in FIG. 5, the financial platform system is a multi-tenant financial platform system, and each financial application 551 and 552 is of an application system that is external to the financial platform system 500. In some implementations, each external application system (e.g., the application system of the application 552) is associated with an account (e.g., "Dev Account A", "Dev Account B" of FIG. 7) of the financial platform system 500. In some implementations, each application proxy instance (e.g., 621-625 of FIGS. 6 and 7) of the application proxy system 520 is associated with an account (e.g., "Dev Account A", "Dev Account B") of the financial platform system (e.g., an account of the of the financial platform system that is associated with an external application system). FIG. 7 depicts exemplary application proxy instances that are associated with respective accounts (e.g., "Dev Account A", "Dev Account B") of the financial platform system 500. In some implementations, each application proxy instance (e.g., 621-625) associated with an external financial application system is constructed to provide a proprietary financial API request to a respective external financial institution system (e.g., 541-543) on behalf of a user (e.g., "User A", "User B" of FIGS. 5-7) of the external application system by simulating an application (e.g., 553 of FIG. 5) of the external financial institution system.

3.2 Single-Tenant Financial Platform System

In some implementations, the financial platform system is a single-tenant financial platform system, and the financial applications are included in a financial application system of the financial platform system 500. Each application proxy instance is constructed to provide a proprietary financial API request to the respective external financial institution system on behalf of a user of the application system (of the financial platform system) by simulating an application of the external financial institution system.

4. METHOD FOR PROCESSING A NORMALIZED FINANCIAL API REQUEST TO PROVIDE TRANSACTION INFORMATION OF FINANCIAL ACCOUNT ENDPOINTS BASED ON ACCOUNT CREDENTIALS

As shown in FIG. 8, a method B00 for processing a normalized API request at a financial platform system (e.g., the financial platform system 500) includes: receiving a normalized financial API request associated with at least one financial account endpoint, the normalized financial API request being provided by an external financial application system (e.g., a financial application system of the application 552 of FIG. 5) by using a financial platform API (e.g., 510 of FIG. 5) of the financial platform system, the normalized financial API request specifying account credentials of each financial account endpoint of the normalized financial API request (process S810). Responsive to the normalized financial API request: transaction information of each financial account endpoint of the normalized financial API request is collected by using an application proxy instance (e.g., a proxy instance 621-625 of FIG. 6) associated with the financial account endpoint to collect the transaction information from a corresponding financial institution system (e.g., an external financial institution system 541-543 of FIG. 5) by using the associated account credentials specified by the normalized financial API request and a proprietary Application Programming Interface (API) (e.g., one of the proprietary APIs 561-563 of FIG. 5) of the financial institution system (process S820); and a normalized financial API response is provided to the external financial application system (process S830). The normalized financial API response provides the transaction information of each financial account endpoint of the normalized financial API request. Each application proxy instance is constructed to simulate an application (e.g., application 553 of FIG. 5) of the corresponding external financial institution system.

In some implementations, the collected transaction information for each financial account endpoint includes at least an account number and a corresponding routing number for use in automated clearing house (ACH) transactions.

In some implementations, the transaction information is collected by processing at least one financial statement accessed from the corresponding external financial institution system.

In some implementations, the financial platform system includes an institution interface module (e.g., 531-533 of FIG. 5) for each external financial institution system (e.g., 541-543), each institution interface module models the proprietary API of the external financial institution system, and each application proxy instance (e.g., 621-625) uses a corresponding institution interface module to collect the transaction information from the external financial institution system.

In some implementations, the financial platform system generates each institution interface module (e.g., 531-533 of FIG. 5) by at least one of: parsing source code of the application (e.g., the application 553 of FIG. 5) of the associated external financial institution system; and parsing communication between the application and the associated external financial institution system.

In some implementations, each institution interface module defines headers of messages sent to the associated external financial institution system.

In the example embodiment of FIG. 8, the method Boo is implemented by the financial platform system 500. In the example embodiment, the financial platform system is constructed to programmatically access transaction information as described herein for the method 800.

4.1 Normalized Financial API Request

The process S810, which includes receiving a normalized financial API request associated with at least one financial account endpoint, functions to control the financial platform system 500 to receive the normalized financial API by using the API 510 of the financial platform system 500. In the embodiment of FIG. 8, the normalized financial API request is provided by an external financial application system (e.g., a financial application system of the application 552 of FIG. 5). In other embodiments, the normalized financial API request is provided by an internal financial application system of the financial platform system 500. The normalized financial API request specifies account credentials of each financial account endpoint of the normalized financial API request.

In some implementations, the normalized financial API request is received as described above for the process S120 of FIG. 1.

4.2 Collecting Transaction Information

The process S820, which includes collecting transaction information of each financial account endpoint of the normalized financial API request, is performed responsive to the normalized financial API request. The process S820 functions to control the financial platform system 500 to use an application proxy instance associated with a financial account endpoint (of the normalized API request) to collect the transaction information from a corresponding financial institution system. The application proxy instance collects the transaction information by using the associated account credentials specified by the normalized financial API request and a proprietary API (e.g., one of the proprietary APIs 561-563 of FIG. 5) of the financial institution system.

In the example embodiment, the application proxy system 520 includes application proxy instances for each financial institution system corresponding to the normalized financial API request.

In some implementations, the transaction information is collected as described above for the process S130 of FIG. 1.

In some implementations, the financial platform system 500 collects the transaction information by using an application proxy instance (e.g., 623 of FIG. 6) associated with a financial account endpoint (of the normalized API request) to access a financial document (e.g., one of the financial documents 592 of FIG. 5) that specifies the requested transaction information. The application proxy instance accesses the financial document by using the associated account credentials specified by the normalized financial API request and a proprietary API (e.g., one of the proprietary APIs 561-563 of FIG. 5) of a financial institution system (e.g., 542) that manages the financial document (e.g., one of the documents 592). The financial platform system 500 stores the accessed financial document (e.g., in a memory 1122 of FIG. 11, a storage medium 1105 of FIG. 11), and controls the document processing engine 522 to process the stored financial document (e.g., one of the stored documents 1101 of FIG. 11) to identify the transaction information. In some implementations, the document processing engine 522 processes the stored financial document by scraping content of financial document to identify the transaction information. In some implementations, the document processing engine 521 performs OCR (optical character recognition) to identify the transaction information included in the financial document.

4.3 Generation of an Application Proxy Instance

Figure 6:
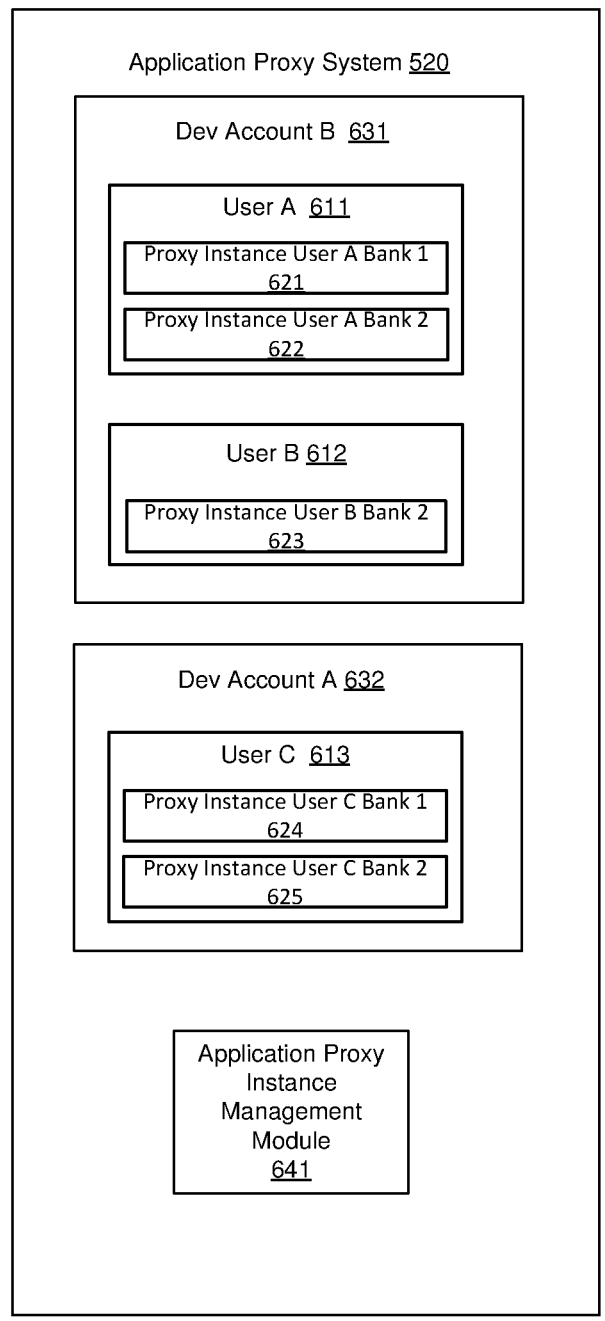
FIG. 6 is a representation of an application proxy system of an embodiment.

In the example embodiment of FIG. 8, each application proxy instance is generated by the management module 641 of FIG. 6. In some implementations, the application proxy instance management module 641 generates each application proxy instance as described above for the process S110 of FIG. 1. In some implementations, the application proxy instance management module 641 generates each application proxy instance responsive to a normalized API request for enrolling a new user account, as described above for the process S110 of FIG. 1.

In some implementations, the application proxy instance management module 641 generates the application proxy instance responsive to a request to generate an application proxy instance. In some implementations, the request to generate an application proxy instance specifies information identifying an external financial institution system, and a user account of an application system (e.g., a user account of an application system of the application 552 of FIG. 5). In some implementations, the request to generate an application proxy instance specifies user credentials for the financial institution system. In some implementations, the request to generate an application proxy instance specifies information identifying an account of the financial platform system 500 associated with the application system. In some implementations, the request to generate an application proxy instance specifies properties for the application proxy instance. In some implementations, properties for the application proxy instance include at least one of a unique user identifier code, an authentication token, a MAC address (e.g., a MAC address of a user device 571-572), financial accounts of the corresponding financial institution system, and any other suitable information.

In some implementations, the application proxy instance management module 641 stores the generated application proxy instance in association with a user account of an application system (e.g., a user account of an application system of the application 552 of FIG. 5, e.g., "User B" of FIG. 7). In some implementations, the application proxy instance management module 641 stores the generated application proxy instance in association with an account (e.g., "Dev Account B" of FIG. 7) of the financial platform system 500 associated with an application system (e.g., an application system of the application 552 of FIG. 5). In some implementations, the application proxy instance management module 641 stores the generated application proxy instance in association with an account of the financial platform system 500 associated with an application system, and a user account of the application system. In some implementations, the application proxy instance management module 641 stores the generated application proxy instance in association with an account of the financial platform system 500 associated with an application system (e.g., "Dev Account B" of FIG. 7), a user account of the application system (e.g., "User B" of FIG. 7), and information identifying the financial institution system of the application proxy instance (e.g., "Bank2"). In some implementations, the application proxy instance management module 641 stores the generated application proxy instance in association with an account of the financial platform system 500 associated with an application system, a user account of the application system, information identifying the financial institution system of the application proxy instance, and information identifying financial accounts of the application proxy instance.

In some implementations, generating the application proxy instance includes controlling the application proxy instance management module 641 to construct the application proxy instance to simulate communication of an application (e.g., application 553 of FIG. 5) of the external financial institution system (of the application proxy instance) with the financial institution system on behalf of the user account of the application system.

In some implementations, generating the application proxy instance includes controlling the application proxy instance management module 641 to register the generated application proxy instance with the external financial institution system.

In some implementations, generating the application proxy instance includes controlling the application proxy instance management module 641 to negotiate registration of the application proxy instance with the financial institution system.

In some implementations, the request to generate an application proxy instance is provided by an application system (e.g., an external application system of the application 552 of FIG. 5). In some implementations, the request to create an application proxy instance is provided by an application system (e.g., an external application system of the application 552 of FIG. 5) responsive to user input received at a user device (e.g., 571, 572) executing machine-readable instructions of an application (e.g., 552 of FIG. 5) of the application system.

4.4 Providing Transaction Information

The process S830, which includes providing a normalized financial API response to the external financial application system, is performed responsive to the normalized financial API request. The process S830 functions to control the financial platform system 500 to provide the normalized financial API response, which includes the transaction information of each financial account endpoint of the normalized financial API request.

In some implementations, the transaction information is provided as described above for the process S140 of FIG. 1.

5. METHOD FOR PROCESSING A NORMALIZED FINANCIAL API REQUEST TO EXECUTE A FINANCIAL TRANSACTION FOR FINANCIAL ACCOUNT ENDPOINTS

As shown in FIG. 9, a method 900 for processing a normalized API request at a financial platform system (e.g., the financial platform system 500) includes: receiving a normalized financial API request associated with at least one financial account endpoint (process S910). The normalized financial API request is provided by an external financial application system by using a financial platform API of the financial platform system. The normalized financial API request specifies a financial transaction and at least one of an account token and account credentials of each financial account endpoint of the normalized financial API request.

Responsive to the normalized financial API request, transaction information of each financial account endpoint of the normalized financial API request is collected (process S920). The transaction information is collected by using an application proxy instance associated with the financial account endpoint to collect the transaction information from a corresponding financial institution system by using at least one of an associated account token and associated account credentials specified by the normalized financial API request and by using a proprietary API of the financial institution system. The transaction specified by the normalized financial API request is executed by using the collected transaction information (process S930). A normalized financial API response is provided to the external system (process S940). The normalized financial API response provides results of the transaction. Each application proxy instance is constructed to simulate an application of the corresponding external financial institution system.

In some implementations, the collected transaction information for each financial account endpoint includes at least an account number and a corresponding routing number for use in automated clearing house (ACH) transactions.

In some implementations, the transaction information is collected by processing at least one financial statement accessed from the corresponding external financial institution system.

In some implementations, the financial platform system includes an institution interface module (e.g., 531-533 of FIG. 5) for each external financial institution system (e.g., 541-543), each institution interface module models the proprietary API of the external financial institution system, and each application proxy instance (e.g., 621-625) uses a corresponding institution interface module to collect the transaction information from the external financial institution system.

In some implementations, the financial platform system generates each institution interface module (e.g., 531-533 of FIG. 5) by at least one of: parsing source code of the application (e.g., the application 553 of FIG. 5) of the associated external financial institution system; and parsing communication between the application and the associated external financial institution system.

In some implementations, each institution interface module defines headers of messages sent to the associated external financial institution system.

In some implementations, the normalized financial API request is received as described above for the process S810 of FIG. 8. In some implementations, the transaction information is collected as described above for the process S820 of FIG. 8. In some implementations, the transaction information is provided as described above for the process S140 of FIG. 1. In some implementations, the transaction information is executed as described above for the process S150 of FIG. 1.

In the example embodiment of FIG. 9, the method 900 is implemented by the financial platform system 500. In the example embodiment, the financial platform system is constructed to programmatically access transaction information as described herein for the method 900.

6. METHOD FOR PROCESSING A NORMALIZED FINANCIAL API REQUEST BASED ON USER INFORMATION

FIG. 10 depicts a method 1000 for processing a normalized API request at a financial platform system (e.g., the financial platform system 500). The financial platform system is constructed to programmatically access at least one external financial institution system (e.g., 541-543) external to the financial platform system. The processes S1010, S1020, and S1030 of the method woo of FIG. 10 are performed responsive to a normalized financial API request provided by a financial application system (e.g., a financial application system of the application 552 of FIG. 5) by using a financial platform API (e.g., 510 of FIG. 5) of the financial platform system (e.g., 500). The normalized financial API request specifies user information corresponding to at least one financial account endpoint of at least one external financial institution system (e.g., 541-543 of FIG. 5).

The process S1010 includes using at least one application proxy instance (e.g., 621-625) associated with the normalized API request to collect transaction information from a corresponding financial institution system by providing the financial institution system with a proprietary financial API request that specifies at least account credentials associated with the user information specified by the normalized financial API request. The transaction information is included in at least one proprietary financial API response provided by the financial institution system.

The process S1020 includes generating a normalized financial API response based on the collected transaction information. The process S1030 includes providing the normalized financial API response to the financial application system.

Each application proxy instance is constructed to simulate an application (e.g., 553 of FIG. 5) of the corresponding financial institution system on behalf of a user associated with the application proxy instance.

In some implementations, each proprietary API (e.g., 561-563) is a private API of the respective financial institution system, and each proprietary API is different from a web browser interface (e.g., 591 of FIG. 5).

In some implementations, the normalized financial API request is provided on behalf of a user account of the financial application system (e.g., the application system of the application 552 of FIG. 5), and the specified user information includes information associated with the user account.

In some implementations, the normalized financial API request is provided on behalf of a user account of the financial application system, and the specified user information includes information associated with a user that is different from a user of the user account of the financial application system.

In some implementations, the normalized financial API request is a request for financial account endpoint information, and each proprietary financial API request is a request for financial account endpoint information, and wherein the transaction information includes financial account endpoint information.

In some implementations, the normalized financial API request is a request to transfer funds from at least one withdrawal account endpoint to at least one deposit account endpoint and the normalized financial API request specifies an amount of funds to be transferred.

In some implementations, the collected transaction information for each financial account endpoint includes at least an account number and a corresponding routing number for use in automated clearing house (ACH) transactions.

In some implementations, the transaction information is collected by processing at least one financial statement accessed from the corresponding external financial institution system.

In some implementations, the financial platform system includes an institution interface module (e.g., 531-533 of FIG. 5) for each external financial institution system (e.g., 541-543), each institution interface module models the proprietary API of the external financial institution system, and each application proxy instance (e.g., 621-625) uses a corresponding institution interface module to collect the transaction information from the external financial institution system.

In some implementations, the financial platform system generates each institution interface module (e.g., 531-533 of FIG. 5) by at least one of: parsing source code of the application (e.g., the application 553 of FIG. 5) of the associated external financial institution system; and parsing communication between the application and the associated external financial institution system.

In some implementations, each institution interface module defines headers of messages sent to the associated external financial institution system.

In some implementations, the normalized financial API request is received as described above for the process S810 of FIG. 8. In some implementations, the transaction information is collected as described above for the process S820 of FIG. 8. In some implementations, the transaction information is collected as described above for the process S130 of FIG. 1. In some implementations, the transaction information is provided as described above for the process S140 of FIG. 1.

In the example embodiment of FIG. 10, the method 1000 is implemented by the financial platform system 500. In the example embodiment, the financial platform system is constructed to programmatically access transaction information as described herein for the method woo.

6.1 Collecting Transaction Information

The process S1010, which includes using at least one application proxy instance associated with the normalized API request to collect transaction information from a corresponding financial institution system, functions to control the financial platform system 500 to use at least one application proxy instance (e.g., 623) associated with the normalized API request to collect transaction information from a corresponding financial institution system (e.g., 542) by providing the financial institution system with a proprietary financial API request that specifies at least account credentials associated with the user information specified by the normalized financial API request. The transaction information is included in at least one proprietary financial API response provided by the financial institution system (e.g., 542).

In some implementations, each proprietary financial API response provides a financial document (e.g., one of the financial documents 592) of a user corresponding to the account credentials of the associated proprietary financial API request, and each financial document includes the requested transaction information. The financial platform system 500 stores the financial documents of each proprietary financial API response (e.g., in a memory 1122 of FIG. 11, a storage medium 1105 of FIG. 11), and controls the document processing engine 522 to process each stored financial document (e.g., one of the stored documents 1101 of FIG. 11) to identify the transaction information. In some implementations, the document processing engine 522 processes the stored financial document by scraping content of financial document to identify the transaction information. In some implementations, the document processing engine 521 performs OCR (optical character recognition) to identify the transaction information included in the financial document.

In some implementations, the financial platform system 500 determines application proxy instances (e.g., 621-625) associated with the normalized financial API request. In some implementations, the financial platform system 500 determines application proxy instances (e.g., 621-625) associated with the normalized financial API request by using the application proxy system 520.

In some implementations, the financial platform system 500 determines application proxy instances (e.g., 621-625) associated with the normalized financial API request based on the user information specified by the normalized financial API request.

6.2 Generating a Normalized Financial API Response

The process S1020, which includes generating a normalized financial API response based on the collected transaction information, functions to control the financial platform system 500 to generate a normalized financial API response to the normalized financial API request. In some implementations, the financial platform system 500 generates the normalized financial API response to include the transaction information collected from each proprietary financial API response provided by an external financial institution system. In some implementations, the financial platform system 500 generates the normalized financial API response based on parameters included in the normalized financial API request. In some implementations, the financial platform system 500 generates the normalized financial API response based on properties of the application proxy instances used to collect the transaction information.

In some implementations, in a case where the normalized financial API request is a request to transfer funds from at least one withdrawal account endpoint to at least one deposit account endpoint, the process S1020 includes using a transaction engine (e.g., 521 of FIG. 5) of the financial platform system 500 to execute an ACH transaction to transfer a specified amount of funds from at least one withdrawal account endpoint to at least one deposit account endpoint by using transaction information collected at the process S1010. In some implementations, the transaction information includes financial account endpoint information. The financial platform system 500 generates the normalized financial API response to include at least one of a status of the transfer and results of the transfer.

In some implementations, in a case where the normalized financial API request is a request to transfer funds from at least one withdrawal account endpoint to at least one deposit account endpoint, the transaction information collected from each proprietary financial API response provided by an external financial institution system corresponds to financial account endpoint information of each withdrawal account endpoint and deposit account endpoint of the normalized financial API request. The application platform system uses the transaction engine 521 to perform the transfer of funds from each withdrawal account endpoint to each respective deposit account endpoint by using the collected financial account endpoint information. The financial platform system 500 generates the normalized financial API response to include at least one of a status of the transfer and results of the requested transfer of funds.

6.3 Providing a Normalized Financial API Response

In some implementations, the process S1030, which includes providing the normalized financial API response to the financial application system, functions to control the financial platform system 500 to provide the normalized financial API response by using the API 510. In some implementations, the financial platform system 500 provides the normalized financial API response as described above for FIGS. 8 and 9.

6.4 Request for Transaction Information

In some implementations, the normalized financial API request is a request for transaction information. In some implementations, the normalized financial API request is a request for transaction information for one user for one external financial intuition. In some implementations, the normalized financial API request is a request for transaction information for one user for more than one external financial intuition. In some implementations, the normalized financial API request is a request for transaction information for more than one user for one or more respective external financial intuitions.

6.4.1 Request for Transaction Information for a User Identified by a User Account Identifier In some implementations, the user information of the normalized financial API request includes a user account identifier for each user account of the application system (e.g., the application system of the financial application 552 of FIG. 5) corresponding to the normalized financial API request.

In some implementations, the normalized financial API request includes parameters as shown in Table 1.

TABLE 1

| NORMALIZED FINANCIAL API REQUEST PARAMETER | DESCRIPTION |
|---|---|
| <Financial Platform Account ID> | An account of an external financial application system (e.g., "Dev Account A", "Dev Account B" of FIGS. 5-7). |
| <User Account Identifier> | An identifier that identifies a user account of the application system identified by the <Financial Platform Account ID> parameter. |
| <Financial Institution ID > | An identifier that identifies an external financial institution system (e.g., 541-543 of FIG. 5). |

In some implementations, the <User Account Identifier> is used to select at least one corresponding application proxy instance (e.g., 621-625), and each selected application proxy instance includes user credentials (e.g., as depicted in FIG. 7) to access the associated financial institution system.

In some implementations, the financial platform system 500 determines an application proxy instance (e.g., 621-625) associated with the normalized API request based on the <Financial Platform Account ID> parameter, the <User Account Identifier> parameter, and the <Financial Institution ID> parameter. In some implementations, the financial platform system 500 identifies an application proxy instance of the application proxy system 520 that is managed in association with the <Financial Platform Account ID> parameter, the <User Account Identifier> parameter, and the <Financial Institution ID> parameter, and uses the identified application proxy instance to collect the transaction information.

For example, in a case where the application proxy system 520 manages application proxy instances 621-625 as shown in FIG. 7, for a normalized financial API request that specifies "Dev Account B" as the <Financial Platform Account ID> parameter, "User A" as the <User Account Identifier> parameter, and "Bank 1" as the <Financial Institution ID> parameter, the financial platform system 500 selects the application proxy instance 621, and uses the <User A Credentials Bank 1> as the user credentials for the proprietary financial API request provided to the external financial system 541 ("Bank 1") of FIG. 5.

In some implementations, each proprietary financial API request includes parameters as shown in Table 2.

TABLE 2

| PROPRIETARY FINANCIAL API REQUEST PARAMETER | DESCRIPTION |
|---|---|
| <User Credentials> | The user credentials of the corresponding normalized financial API request. The user credentials are specified by the application proxy instance, e.g., 621-625, (e.g., as shown in FIG. 7) used to provide the proprietary financial API request. |

6.4.2 Request for Transaction Information for a User Identified by User Credentials In some implementations, the user information of the normalized financial API request includes at least one set of user credentials for each user account of the application system (e.g., the application system of the financial application 552 of FIG. 5) corresponding to the normalized financial API request.

In some implementations, the normalized financial API request includes parameters as shown in Table 3.

TABLE 3

| NORMALIZED FINANCIAL API REQUEST PARAMETER | DESCRIPTION |
|---|---|
| <Financial Platform Account ID> | An account of an external financial application system (e.g., "Dev Account A", "Dev Account B" of FIGS. 5-7). |
| <User Credentials> | Financial institution Credentials of a user of the financial institution system identified by the <Financial Institution ID> parameter. |
| <Financial Institution ID> | An identifier that identifies an external financial institution system (e.g., 541-543 of FIG. 5). |

In some implementations, the financial platform system 500 determines an application proxy instance (e.g., 621-625) associated with the normalized API request based on the <Financial Platform Account ID> parameter and the <Financial Institution ID> parameter. In some implementations, the financial platform system 500 identifies an application proxy instance of the application proxy system 520 that is managed in association with the <Financial Platform Account ID> parameter and the <Financial Institution ID> parameter, and uses the identified application proxy instance to collect the transaction information.

In some implementations in which the normalized financial API request includes at least one set of user credentials, rather than using an application proxy instance, the financial platform system 500 identifies an institution interface module (e.g., 531-533) of the financial institution system identified by the <Financial Institution ID> parameter, and uses the identified institution interface module to collect the transaction information.

In some implementations, each proprietary financial API request includes parameters as shown in Table 4.

TABLE 4

| PROPRIETARY FINANCIAL API REQUEST PARAMETER | DESCRIPTION |
| --- | --- |
| <User Credentials> | The user credentials of the corresponding normalized financial API request. |

6.4.3 Request for Transaction Information for a User Identified by a User Account Token In some implementations, the user information of the normalized financial API request includes a user account token for each user account of the application system (e.g., the application system of the financial application 552 of FIG. 5) corresponding to the normalized financial API request.

In some implementations, the normalized financial API request includes parameters as shown in Table 5.

TABLE 5

| NORMALIZED FINANCIAL API REQUEST PARAMETER | DESCRIPTION |
| --- | --- |
| <Financial Platform Account ID> | An account of an external financial application system (e.g., "Dev Account A", "Dev Account B" of FIGS. 5-7). |
| <User Account Token> | An account token that identifies a user account of the application system identified by the <Financial Platform Account ID> parameter. In some implementations, the account token is provided in a response to a request to enroll the user account of the application system at the application platform system, as described above for Silo of FIG. 1. |
| <Financial Institution ID> | An identifier that identifies an external financial institution system (e.g., 541-543 of FIG. 5). |

In some implementations, each application proxy instance is stored in association with a respective user account token. In some implementations, each application proxy instance is stored in association with information that identifies a respective user account token. In some implementations, each account token is stored at the financial platform system 500 in association with a user account identifier.

In some implementations, the <User Account Token> is used to select at least one corresponding application proxy instance (e.g., 621-625), and each selected application proxy instance includes user credentials (e.g., as depicted in FIG. 7) to access the associated financial institution system. In some implementations, a user account identifier corresponding to the <User Account Token> is determined, and the determined user account identifier is used to select at least one corresponding application proxy instance (e.g., 621-625), and each selected application proxy instance includes user credentials (e.g., as depicted in FIG. 7) to access the associated financial institution system.

In some implementations, the financial platform system 500 determines an application proxy instance (e.g., 621-625) associated with the normalized API request based on the <Financial Platform Account ID> parameter, the <User Account Token> parameter, and the <Financial Institution ID> parameter. In some implementations, the financial platform system 500 identifies an application proxy instance of the application proxy system 520 that is managed in association with the <Financial Platform Account ID> parameter, the <User Account Token> parameter, and the <Financial Institution ID> parameter, and uses the identified application proxy instance to collect the transaction information.

In some implementations, the financial platform system 500 determines a user account identifier associated with the user account token, and identifies an application proxy instance of the application proxy system 520 that is managed in association with the <Financial Platform Account ID> parameter, the determined user account identifier, and the <Financial Institution ID> parameter, and uses the identified application proxy instance to collect the transaction information.

For example, in a case where the application proxy system 520 manages application proxy instances 621-625 as shown in FIG. 7, for a normalized financial API request that specifies "Dev Account B" as the <Financial Platform Account ID> parameter, a <User Account Token> parameter associated with "User A", and "Bank 1" as the <Financial Institution ID> parameter, the financial platform system 500 selects the application proxy instance 621, and uses the <User A Credentials Bank 1> as the user credentials for the proprietary financial API request provided to the external financial system 541 ("Bank 1") of FIG. 5.

In some implementations, each proprietary financial API request includes parameters as shown in Table 6.

TABLE 6

| PROPRIETARY FINANCIAL API REQUEST PARAMETER | DESCRIPTION |
| --- | --- |
| <User Credentials> | The user credentials of the corresponding normalized financial API request. The user credentials are specified by the application proxy instance, e.g., 621-625, (e.g., as shown in FIG. 7) used to provide the proprietary financial API request. |

6.5 Request to Transfer Funds

In some implementations, the normalized financial API request is a request to transfer funds from at least one withdrawal account endpoint to at least one deposit account endpoint. In some implementations, each endpoint is identified by user information specified by the normalized financial API transfer request. In some implementations, user information for an endpoint includes at least one of a user account identifier, a user account token, and user credentials. In some implementations, one or more endpoints are identified by financial account endpoint information (e.g., an account number and corresponding routing number) specified by the normalized financial API transfer request and one or more endpoints are identified by user information specified by the normalized financial API transfer request. In some implementations, the normalized financial API request specifies an amount of funds to be transferred. In some implementations, the normalized financial API request specifies an originating financial institution system that initiates the transfer of funds.

In some implementations, the financial platform system 500 processes a normalized financial API request to transfer funds by determining withdrawal account endpoints and deposit account endpoints specified by the normalized financial API request to transfer funds. For each endpoint identified by user information of the normalized financial API request, the financial platform system 500 collects transaction information as described above for processes S130 of FIG. 1, 8820 of FIG. 8, 8920 of FIG. 9, and S1010 of FIG. 10. Responsive to collection of the transaction information for each endpoint identified by user information, a transaction engine (e.g., the transaction engine 521 of FIG. 5) of the financial platform system 500 is used to execute the transfer of funds in accordance with one or more parameters (e.g., amount of funds, originating financial institution system, and the like) of the normalized financial API request to transfer funds. In some implementations, the funds are transferred by executing an ACH transaction to transfer the specified amount of funds from one or more withdrawal account endpoints to one or more deposit account endpoints. In some implementations, the transaction engine initiates the transfer of funds from an originating financial institution system specified by the normalized financial API request. In some implementations, a normalized financial API response (to the normalized financial API request to transfer funds) includes at least one of a status of the transfer and results of the transfer of funds.

In some implementations, in a case where more than one withdrawal account endpoint is specified by the normalized financial API transfer request, the financial platform system 500 selects one or more of the withdrawal account endpoints for the transfer based on at least one of capabilities of the withdrawal account endpoints, availability of the withdrawal account endpoints, configuration for the withdrawal account endpoints, and parameters of the normalized financial API request.

In some implementations, in a case where more than one deposit account endpoint is specified by the normalized financial API transfer request, the financial platform system 500 selects one or more of the deposit account endpoints for the transfer based on at least one of capabilities of the deposit account endpoints, availability of the deposit account endpoints, configuration for the deposit account endpoints, and parameters of the normalized financial API request.

In some implementations, in a case where a user (identified by a user account identifier, a user account token, or a set of user credentials) specified by the normalized financial API transfer request is associated with multiple account endpoints (e.g., a user has accounts at different financial institution systems, or multiple accounts at one financial institution system), the financial platform system 500 selects one or more of the endpoints associated with the user for the transfer based on at least one of capabilities of the account endpoints, availability of the account endpoints, configuration for the account endpoints, and parameters of the normalized financial API request.

In some implementations, one endpoint of a user is configured as a primary account and another account of the user is configured as a secondary account. In a case where the transaction engine 521 cannot complete the transfer by using the primary account, the transaction engine 521 selects the secondary account for use in execution of the transfer.

In some implementations, a set of accounts may be preconfigured to be used depending on properties of the normalized financial API transfer request. In some implementations, the normalized financial API transfer request specifies user information that identifies a proxy transfer endpoint, and the financial platform system 500 automatically selects a financial account to use for the transfer of funds based on configuration information of the proxy transfer endpoint.

In some implementations, during processing of a normalized financial API transfer request that specifies a proxy transfer endpoint, the financial platform system 500 automatically splits the requested transaction into multiple sub-transactions by using multiple accounts associated with the proxy transfer endpoint, in accordance with configuration for the proxy transfer endpoint. For example, an account holder may set a proxy transfer endpoint to automatically split deposits between two accounts in a 30/70 balance.

6.5.1 Request to Transfer Funds by Using Proxy Accounts

In some implementations, the transaction engine 522 executes the transfer by establishing proxy accounts in at least two institutions, and expedites transactions between the two institutions through a an internal deposit to a first proxy account in a first institution and a second internal deposit from a second proxy account in the second institution. In some implementations, the proxy accounts include a funds reserve, which may be periodically balanced between proxy accounts to maintain an operational reserve of funds.

7. SYSTEM ARCHITECTURE: FINANCIAL PLATFORM SYSTEM

Figure 11:
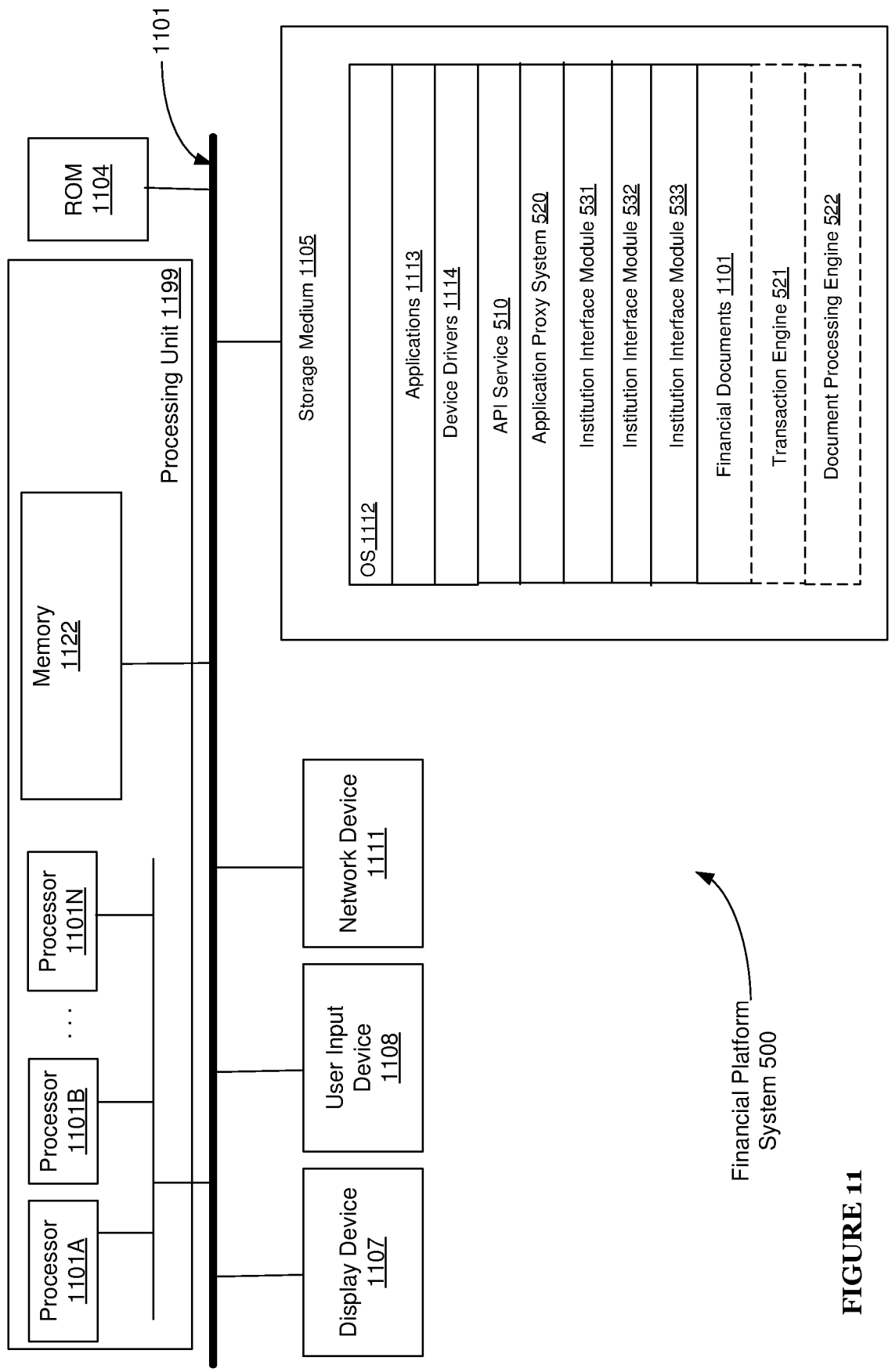
FIG. 11 is an architecture diagram of system of an embodiment.

FIG. 11 is an architecture diagram of a system (e.g., the system 200 of FIG. 2, the financial platform system 500 of FIG. 5) according to an implementation in which the system is implemented by a server device. In some implementations, the system is implemented by a plurality of devices.

The bus 1101 interfaces with the processors 1101A-1101N, the main memory (e.g., a random access memory (RAM)) 1122, a read only memory (ROM) 1104, a processor-readable storage medium 1105, a display device 1107, a user input device 1108, and a network device 1111.

The processors 1101A-1101N may take many forms, such as ARM processors, X86 processors, and the like.

In some implementations, the system (e.g., 500) includes at least one of a central processing unit (processor) and a multi-processor unit (MPU).

The processors 1101A-1101N and the main memory 1122 form a processing unit 1199. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of an API Service, an application proxy system, one or more instance interface modules, financial documents, a transaction engine, and a document processing engine.

The network adapter device 1111 provides one or more wired or wireless interfaces for exchanging data and commands between the system (e.g., 500) and other devices, such as financial institution systems (e.g., 541-543), user devices (e.g., 571-572). Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory 1122 (of the processing unit 1199) from the processor-readable storage medium 1105, the ROM 1104 or any other storage location. During execution of these software programs, the respective machine-executable instructions are accessed by at least one of processors 1101A-1101N (of the processing unit 1199) via the bus 1101, and then executed by at least one of processors 1101A-1101N. Data used by the software programs are also stored in the memory 1122, and such data is accessed by at least one of processors 1101A-1101N during execution of the machine-executable instructions of the software programs. The processor-readable storage medium 1105 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1105 includes an operating system 1112, software programs 1113, device drivers 1114, the API Service 510, the application proxy system 520, the institution Interface modules 531-533, and financial documents 1101. In some implementations, the processor-readable storage medium 1105 includes the transaction engine 521 and the document processing engine 522.

8. MACHINES

The system and methods of the preferred embodiment and variations thereof can be embodied and/or implemented at least in part as a machine configured to receive a computer-readable medium storing computer-readable instructions. The instructions are preferably executed by computer-executable components preferably integrated with the financial application programming interface platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

9. CONCLUSION

As a person skilled in the art will recognize from the previous detailed description and from the figures and claims, modifications and changes can be made to the preferred embodiments of the invention without departing from the scope of this invention defined in the following claims.

What is claimed is:

1. A computer system comprising:
one or more computer-readable storage devices configured to store a plurality of computer executable instructions; and
one or more hardware computer processors in communication with the one or more computer-readable storage devices and configured to execute the plurality of computer executable instructions in order to cause the computer system to:
receive, from a first computing device, a request for data associated with a user, the request including authentication credentials associated with the user;
identify an institution associated with the request;
instantiate a simulated instance of a software application associated with the institution, wherein the simulated instance of the software application is configured to interface, via an application programming interface ("API"), with a second computing device that is associated with the institution;
request, by the simulated instance of the software application and via the API, an electronic document associated with the user from the second computing device;
receive the electronic document associated with the user from the second computing device; and
analyze the electronic document to extract account information associated with the user.

2. The computer system of claim 1, wherein the one or more hardware computer processors are configured to execute the plurality of computer executable instructions in order to further cause the computer system to:
authenticate the simulated instance of the software application with the second computing device based on at least one of: an identifier code, an authentication token, or a Media Access Control (MAC) address.

3. The computer system of claim 2, wherein the simulated instance of the software application is configured to appear, from the perspective of the second computing device, to be the software application executing on a physical computing device of the user.

4. The computer system of claim 2, wherein:
the authentication credentials associated with the user include at least a username associated with the user, and a password associated with the user; and
requesting the electronic document associated with the user further includes providing, to the second computing device, the username associated with the user and the password associated with the user.

5. The computer system of claim 1, wherein analyzing the electronic document comprises:
electronically scraping data from the electronic document including the account information.

6. The computer system of claim 5, wherein analyzing the electronic document further comprises:
executing an extraction script on the electronic document.

7. The computer system of claim 5, wherein analyzing the electronic document further comprises:
performing an optical character recognition process on the electronic document.

8. The computer system of claim 1, wherein the electronic document is in a PDF (Portable Document Format) format.

9. The computer system of claim 1, wherein the one or more hardware computer processors are configured to execute the plurality of computer executable instructions in order to further cause the computer system to:
initiate, by the simulated instance of the software application and via the API, a transaction to or from an account indicated by the account information.

10. The computer system of claim 1, wherein the one or more hardware computer processors are configured to execute the plurality of computer executable instructions in order to further cause the computer system to:
initiate, via the API or another API, a transaction to or from an account indicated by the account information.

11. The computer system of claim 10, wherein the one or more hardware computer processors are configured to execute the plurality of computer executable instructions in order to further cause the computer system to:
determine, via the API or the another API, a status of the transaction; and
provide, to another computing device, the status of the transaction.

12. The computer system of claim 11, wherein providing the status of the transaction comprises causing electronically initiating communication via at least one of: email, text message, platform message, phone call, HTTP message, or programmatic event.

13. The computer system of claim 12, wherein providing the status of the transaction comprises providing a notification indicating at least one of: a transaction value exceeding a threshold, or a transaction value being less than a threshold.

14. The computer system of claim 1, wherein the one or more hardware computer processors are configured to execute the plurality of computer executable instructions in order to further cause the computer system to:
receive a request to initiate a transaction using the account information;
determine a parameter value of an account indicated by the account information;
determine whether the parameter value satisfies a condition of the request; and
in response to the parameter value not satisfying the condition, provide a notification.

15. The computer system of claim 14, wherein the parameter value indicates at least one of: a transaction availability of the account, an age of the account, a range of transactions of the account, or a likelihood of fraud associated with the account.

16. The computer system of claim 1, wherein the one or more hardware computer processors are configured to execute the plurality of computer executable instructions in order to further cause the computer system to:
receive a request to execute a transaction, wherein the transaction indicates an other account; and
in response to receiving the request:
  initiate, by the simulated instance of the software application and via the API, a first transaction from an account indicated by the account information to a first proxy account; and
  initiate, via the API or another API, a second transaction from a second proxy account to the other account.

17. The computer system of claim 1, wherein the one or more hardware computer processors are configured to execute the plurality of computer executable instructions in order to further cause the computer system to:
receive a request to execute a transaction, wherein the transaction indicates an other account; and
in response to receiving the request:
  initiate, by the simulated instance of the software application and via the API, a first transaction to an account indicated by the account information from a first proxy account; and
  initiate, via the API or another API, a second transaction to a second proxy account from the other account.

18. The computer system of claim 1, wherein the one or more hardware computer processors are configured to execute the plurality of computer executable instructions in order to further cause the computer system to:
provide, to another computing device, the account information.

19. A computer-implemented method comprising:
by one or more hardware processors executing program instructions:
  receiving, from a first computing device, a request for data associated with a user, the request including authentication credentials associated with the user;
  identifying an institution associated with the request;
  instantiating a simulated instance of a software application associated with the institution, wherein the simulated instance of the software application is configured to interface, via an application programming interface ("API"), with a second computing device that is associated with the institution;
  requesting, by the simulated instance of the software application and via the API, an electronic document associated with the user from the second computing device;
  receiving the electronic document associated with the user from the second computing device; and
  analyzing the electronic document to extract account information associated with the user.

20. The computer-implemented method of claim 19 further comprising:
by the one or more hardware processors executing program instructions:
  receiving a request to initiate a transaction using the account information;
  determining a parameter value of an account indicated by the account information;
  determining whether the parameter value satisfies a condition of the request;
  in response to the parameter value not satisfying the condition, providing a notification; and
  in response to the parameter value satisfying the condition, initiating, by the simulated instance of the software application and via the API, the transaction using the account information.

* * * * *

UNITED STATES PATENT AND TRADEMARK OFFICE
CERTIFICATE OF CORRECTION

PATENT NO. : 10,614,463 B1
APPLICATION NO. : 15/455959
DATED : April 7, 2020
INVENTOR(S) : William Hockey Page 1 of 1

It is certified that error appears in the above-identified patent and that said Letters Patent is hereby corrected as shown below:

In the Specification

Column 6 Line 4, Change "a an" to --an--.

Column 9 Line 39, Change "FIG. 1i" to --FIG. 11--.

Column 10 Line 34, Change "of the of the" to --of the--.

Column 10 Line 66, Change "Boo" to --800--.

Column 11 Line 57, Change "Boo" to --800--.

Column 15 Line 56, Change "woo" to --1000--.

Column 17 Line 17, Change "woo" to --1000--.

Column 21 Line 35, Change "Silo" to --S110--.

Column 23 Line 3, Change "8820" to --S820--.

Column 23 Line 3, Change "8920" to --S920--.

Column 24 Line 17, Change "a an" to --an--.

Signed and Sealed this
Fourth Day of August, 2020

Andrei Iancu
*Director of the United States Patent and Trademark Office*